(12) United States Patent
Zhao et al.

(10) Patent No.: US 12,002,150 B2
(45) Date of Patent: Jun. 4, 2024

(54) SYSTEMS AND METHODS FOR PHYSICALLY-BASED NEURAL FACE SHADER VIA VOLUMETRIC LIGHTMAPS

(71) Applicant: University of Southern California, Los Angeles, CA (US)

(72) Inventors: Yajie Zhao, Los Angeles, CA (US); Jing Yang, Los Angeles, CA (US); Hanyuan Xiao, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 47 days.

(21) Appl. No.: 17/735,869

(22) Filed: May 3, 2022

(65) Prior Publication Data

US 2023/0027890 A1 Jan. 26, 2023

Related U.S. Application Data

(60) Provisional application No. 63/183,497, filed on May 3, 2021.

(51) Int. Cl.
| | |
|---|---|
| *G06T 15/50* | (2011.01) |
| *G06T 15/04* | (2011.01) |
| *G06T 15/10* | (2011.01) |
| *G06T 15/80* | (2011.01) |

(52) U.S. Cl.
CPC ............ *G06T 15/506* (2013.01); *G06T 15/04* (2013.01); *G06T 15/10* (2013.01); *G06T 15/80* (2013.01)

(58) Field of Classification Search
None
See application file for complete search history.

(56) References Cited

U.S. PATENT DOCUMENTS

| | | | |
|---|---|---|---|
| 2015/0193967 A1* | 7/2015 | Wang | G06N 20/00 345/426 |
| 2016/0307369 A1* | 10/2016 | Freedman | G06T 15/405 |
| 2020/0210769 A1* | 7/2020 | Hou | G06F 18/211 |
| 2021/0118157 A1* | 4/2021 | LeGendre | G06T 11/001 |
| 2022/0051471 A1* | 2/2022 | Logothetis | G06V 10/766 |
| 2022/0335636 A1* | 10/2022 | Bi | G06T 7/586 |

OTHER PUBLICATIONS

Huynch Mesoscopic Facial Geometry Inference Using Deep Neural Networks, IEEE/CVF Conference on Computer Vision and Pattern Recognition, 2018 (Year: 2018).*

(Continued)

*Primary Examiner* — Yingchun He
(74) *Attorney, Agent, or Firm* — NIXON PEABODY LLP

(57) ABSTRACT

Methods and systems are provided for rendering photo-realistic images of a subject or an object using a differentiable neural network for predicting indirect light behavior. In one example, the differentiable neural network outputs a volumetric light map comprising a plurality of spherical harmonic representations. Further, using a reflectance neural network, roughness and scattering coefficients associated with the subject or the object is computed. The volumetric light map, as well as the roughness and scattering coefficients are the utilized for rendering a final image under one or more of a desired lighting condition, desired camera view angle, and/or with a desired visual effect (e.g., expression change).

19 Claims, 24 Drawing Sheets
(17 of 24 Drawing Sheet(s) Filed in Color)

(56) References Cited

OTHER PUBLICATIONS

Huynch et al. Mesoscopic Facial Geometry Inference Using Deep Neural Networks, IEEE/CVF Conference on Computer Vision and Pattern Recognition, 2018 (Year: 2018).*

Rauwendaal Voxel Based Indirect Illumination using Spherical Harmonics, Thesis submitted to Oregon State University, downloaded @downloaded @Graduate Thesis or Dissertation | Voxel based indirect illumination using spherical harmonics | ID: 0z709173x | ScholarsArchive@OSU (oregonstate.edu) (Year: 2014).*

* cited by examiner

| | Input | Output | | Novel Subject | Novel Viewpoint |
|---|---|---|---|---|---|
| | | Directional light | HDRI | | |
| DPR | Single-view + Known SH | ✗ | ✗ | ✓ | ✗ |
| SIPR | Single-view + Known OLAT | ✓ | ✓ | ✓ | ✗ |
| FRF | Single-view + Known OLAT | ✓ | ✓ | ✓ | ✓ |
| Neural-PIL | Multi-view + Unknown lighting | ✓ | ✓ | ✗ | ✓ |
| NeLF | Multi-view + Known HDRI | ✗ | ✓ | ✓ | ✓ |
| Present rendering method | Coarse Geometry + Albedo + Normal + Known HDRI | ✓ | ✓ | ✓ | ✓ |

FIG. 14

SYSTEMS AND METHODS FOR PHYSICALLY-BASED NEURAL FACE SHADER VIA VOLUMETRIC LIGHTMAPS

CROSS REFERENCE TO RELATED APPLICATIONS

This application claims priority to U.S. Provisional Application No. 63/183,497, filed May 3, 2021 titled SYSTEMS AND METHODS FOR PHYSICALLY-BASED NEURAL FACE SHADER VIA VOLUMETRIC LIGHTMAPS, the contents of all of which are incorporated herein by reference.

STATEMENT REGARDING FEDERALLY SPONSORED RESEARCH OR DEVELOPMENT

This invention was made with government support under Grant Nos. 1042741-396242 awarded by Semiconductor Research Corporation; N00014-17-S-F014 awarded by Office of Naval Research; and W911NF-14-D-0005 and W911NF-20-2-0053 awarded by Army Research Laboratory. The government has certain rights in the invention.

FIELD

The present invention relates to image rendering, and more particularly to physically-based image rendering.

BACKGROUND

The following description includes information that may be useful in understanding the present invention. It is not an admission that any of the information provided herein is prior art or relevant to the presently claimed invention, or that any publication specifically or implicitly referenced is prior art.

High-fidelity digital human modeling approaches such as Unreal Engine MetaHumans brings an incredible boost in photo-realistic application. To achieve such lifelike high quality, professional artists and engineers work hand-in-hand to synthesize complex interactions of light and material, even with dedicated scanning devices for skin reflectance, and pore-level details measurement. This material creation pipeline results in extremely high costs and long production cycles.

SUMMARY

Methods and systems are provided for performing physically-based rendering with high-fidelity and improved computational speed to render photo-realistic images. In particular, machine learning models are implemented to learn reflectance representations and indirect lighting representations to generate a volumetric radiance field, which is then used for final image rendering. The methods and systems enable relighting a subject or an object under any illumination condition and with pore-level details.

In one embodiment, a method for rendering an image of a subject or an object comprises receiving, at a processor, one or more first input images of the subject or the object, and a desired lighting condition; processing, via the processor, the one or more input images to output one or more rendering assets; generating, via the processor, a volumetric radiance field corresponding to the subject or the object and a desired lighting condition based on one or more of the one or more rendering assets, a first trained neural network and a second trained neural network; and rendering, via a display communicatively coupled to the processor, a second image of the subject or the object under the desired lighting condition.

In another embodiment, a method for rendering an image of a subject or an object comprises: receiving, at a processor, one or more first input images including a subject or an object, a desired camera viewing angle of the subject, and a desired lighting condition; learning, via the processor, a set of reflectance representations using a first trained neural network, the set of reflectance representations based on the one or more input images and the desired camera viewing angle; generating, via the processor, a volumetric light map based on a set of indirect light representations using a second trained neural network based on the one or more input images, the desired camera viewing angle, and the desired lighting condition; and generating, via the processor, a volumetric radiance field based on the set of reflectance representations, the volumetric light map, and the one or more input images; and rendering, via a display communicatively coupled to the processor, a second image of the subject or the object at the desired viewing angle and the desired lighting condition.

In another embodiment, a system, comprises: one or more memories storing instructions and storing a first trained neural network model and a second trained neural network model; one or more processors that are coupled to the one or more memories and when executing the instructions, are configured to: learn a set of reflectance representations corresponding to a subject in a first image according to a first trained neural network model; generate a volumetric light map based a set of learnt indirect light representations corresponding to the subject and a first lighting condition according to a second trained neural network model; and render one or more second images of the subject under the desired lighting condition based on the set of reflectance representations and the volumetric light map.

In one embodiment, the one or more rendering assets including one or more of a camera direction, a lighting condition, a three-dimensional geometry (e.g., a base mesh), and one or more maps (e.g., albedo, normal, high-frequency normal map, displacement map, etc.) may be used as direct inputs into a trained rendering model, wherein the rendering model includes a first trained neural network configured to learn skin reflectance and a second trained neural network configured to output a volumetric lightmap. Further, a radiance field is generated based on a direct lighting, and a skin reflectance and volumetric lightmap for indirect lighting. In particular, the volumetric light map is models indirect illumination (that is, lighting not from the external light sources, but from the reflection and refraction of the objects in the scenes) in the environment, which is not tractable using the traditional ray tracing strategy. The volumetric light map is based on a plurality of spherical harmonic representations to model the entire illumination field, where each spherical harmonic representation is represented as a set of weights for spherical harmonics and models the total incoming lights at a sampling point. Furthermore, a high-frequency normal is introduced into the rendering equation to capture the fine grain in the rendering results.

In this way, provided herein are rendering methods with demonstrated quality/fidelity and efficiency, as evidenced by experimental results described further below. The rendering pipeline described herein out-performs all the existing neural face shaders significantly and also yields competitive quality as may be obtained with renderers that use extensive ray-tracing methods such as Arnold renderer for Maya. The methods and systems for rendering images described herein provide technical effect of improvement in rendering speed in querying novel views, lights or subjects, as demonstrated by quantitative experiments described below. Further, the methods and systems described herein not only significantly reduce the production cycle and cost in industrial pipelines, but also boost the development of fundamental computer vision and differentiable rendering tasks by introducing the easy-to-use high quality human rendering.

In one embodiment, the rendering pipeline described herein including the generation of volumetric light maps for determining indirect light behavior in a given environment, can be used for rendering photo-realistic rendering of a subject or an object. As non-limiting examples, the rendering pipeline may be used for animation renderings, teleconference avatars, and/or virtual assistants.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF DRAWINGS

The patent or application file contains at least one drawing executed in color. Copies of this patent or patent application publication with color drawing(s) will be provided by the Office upon request and payment of the necessary fee.

In order to describe the manner in which the above-recited disclosure and its advantages and features can be obtained, a more particular description of the principles described above will be rendered by reference to specific examples illustrated in the appended drawings. These drawings depict only example aspects of the disclosure, and are therefore not to be considered as limiting of its scope. These principles are described and explained with additional specificity and detail through the use of the following drawings:

FIG. 5B is a continuation of FIG. 5A, according to one or more embodiments of the present disclosure;

FIG. 14 shows a table including comparisons of the rendering method described herein with other methods, according to one or more embodiments of the disclosure;

DETAILED DESCRIPTION

Figure 1A:
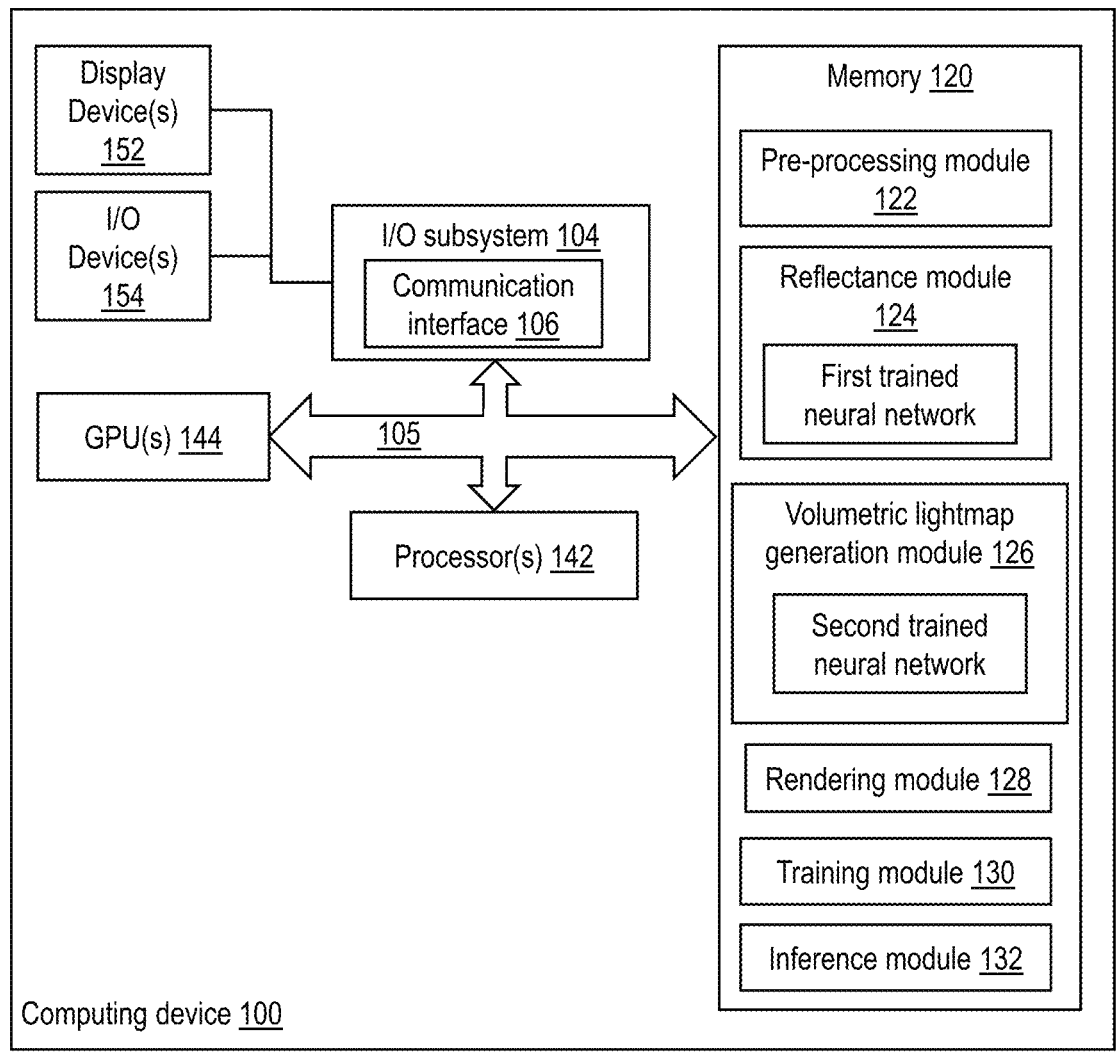
FIG. 1A shows a block diagram of a system for rendering images, according to one or more embodiments of the present disclosure.

Unless defined otherwise, technical and scientific terms used herein have the same meaning as commonly understood by one of ordinary skill in the art to which this invention belongs. One skilled in the art will recognize many methods and materials similar or equivalent to those described herein, which could be used in the practice of the present invention. Indeed, the present invention is in no way limited to the methods and materials specifically described. For example, the Figures primarily illustrate the present invention in the gastrointestinal tract, but as indicated throughout, the disclosed systems and methods can be used for other applications.

In some embodiments, properties such as dimensions, shapes, relative positions, and so forth, used to describe and claim certain embodiments of the invention are to be understood as being modified by the term "about."

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Overview

The rendering of high-fidelity human faces in industries, such as film, gaming industry, etc., requires extensive manipulation by professionals and require large computational power that can easily result in high production cost and long rendering cycles. In particular, ray tracing approaches used in physically-based rendering are extensively time consuming (e.g., more than two hours to render a face in 2K resolution using Maya Arnold).

On the other hand, academic research approaches adopt inexpensive neural rendering with less reliance on the artist's knowledge. However, the images rendered are relatively low quality. Some approaches, such as Neural Reflectance Field-based approaches by *Mildenhall et al. titled NeRF: Representing scenes as neural radiance fields for view synthesis. In European Conference on Computer Vision. Springer,* 405-421, 2020 *and Srinivasan et al. titled NeRV: Neural Reflectance and Visibility Fields for Relighting and View Synthesis. arXiv preprint arXiv:*2012.03927 (2020). may synthesize photo-realistic images from novel views. However, the above-mentioned approaches cannot be effectively used for relighting or are focused on direct lighting only. Further, the above-mentioned approaches cannot be implemented for changing expressions or changing subject without re-training.

To fill the gap between high-quality yet costly physically-based rendering often used in industry and efficient yet low-fidelity neural rendering frequently used in academia, methods and systems are provided for rendering one or more images using one or more neural network models that are differentiable and trained using lightstage scanned images and augmented images. The rendering pipeline comprises a rendering method that implements a volumetric radiance field using a first neural network for reflectance representations and a second neural network for generating a volumetric light map including indirect light representations. The first and the second neural networks, once trained, may render novel views under novel lighting conditions in seconds. That is, the two trained networks are used to render novel views.

As one example a skin reflectance network (that is, the first neural network) models the mapping from the input features to different BRDF in the training database (various subjects captured in lightstage) and automatically predicts high-frequency skin details along with material property without the requirement of special devices or manual intervention during testing. Further, a differential volumetric light map generated via a volumetric light map network (that is, the second neural network) is used for approximating the inter-reflection effect, which is usually achieved by expensive ray-tracing and photon mapping. Furthermore, high-frequency normal is introduced into the rendering equation to capture the fine grain in the rendering results.

In this way, provided herein are rendering methods with demonstrated quality/fidelity and efficiency, as evidenced by experimental results described further below. The rendering pipeline described herein out-performs all the existing neural face shaders significantly and also yields competitive quality as may be obtained with renderers that use extensive ray-tracing methods such as Arnold renderer for Maya. The methods and systems for rendering images described herein provide technical effect of improvement in rendering speed in querying novel views, lights or subjects, as demonstrated by quantitative experiments described below. Further, the methods and systems described herein not only significantly reduces the production cycle and cost in industrial pipelines, but also boosts the development of fundamental computer vision and differentiable rendering tasks by introducing the easy-to-use high quality human rendering.

Systems

FIG. 1A is a block diagram illustrating a computing system 100 configured to implement one or more aspects of the embodiments described herein. The computing system 100 includes one or more processor(s) 142 and a memory 120 communicating via an interconnecting bus 105. In some examples, the interconnecting bus may include a memory hub (not shown), which may be a separate component within a chipset or may be integrated within the one or more processor(s) 142. The computing system 100 further comprises an I/O subsystem 104 that may enable the computing system 100 to receive input from one or more I/O device(s) 154. Additionally, the I/O subsystem 104 is communicatively coupled to one or more display device(s) and the I/O subsystem 104 may be configured to enable a display controller, which may be included in the one or more processor(s) 142, to provide outputs to one or more display device(s) 152. In one embodiment, the one or more display device(s) 152 may include a local, internal, or embedded display device.

In one example, the one or more display device(s) 152 may be a monitor for displaying information and images to users. The I/O device(s) 154 may be devices that receive various inputs from a user and provide various outputs to the user, and may include a keyboard, a remote controller, a mouse, a printer, audio input/output devices, and so forth.

In one embodiment, the computing device 100 further includes one or more graphical processing unit(s) 144. In one embodiment, the one or more GPU(s) 144 form a graphics processing subsystem that can output pixels to one of the one or more display device(s) 152 coupled via the I/O subsystem 104. The one or more GPU(s) may also include a display controller and display interface (not shown) to enable a direct connection to other one or more display device(s) (not shown). Communication paths interconnecting the various components in FIG. 1A may be implemented using any suitable protocols, such as PCI (Peripheral Component Interconnect) based protocols (e.g., PCI-Express), or any other bus or point-to-point communication interfaces and/or protocol(s), such as the NVLink high-speed interconnect, or interconnect protocols known in the art.

Further, the one or more GPU(s) 144 may execute instructions suitable for enabling the functions described herein. In particular, the one or more GPU(s) 144 may be used in connection with particular image-related operations which the one or more GPU(s) 144 are uniquely suited to perform. Further, in some embodiments, the one or more GPU(s) 144 may be configured for the purpose of processing visual data, particularly vector and shading, and performs faster memory operations and access, along with performing specialized lighting operations. In various implementations, the instruction sets and memory in the one or more GPU(s) 144 may be configured for operation upon graphical data. In this way, the one or more GPU(s) 144 may be configured for operation upon the image data or to quickly and efficiently performing the complex mathematical operations described herein. The one or more graphics processing units may be configured in a so-called multi-core format, or linked by a bus or other connection that may together be applied to a single set of or to multiple processing operations.

The I/O subsystem 104 includes a communication interface 106 configured to provide an interface mechanism to enable connections between the computing device 100 and other components, such as a server or an edge device, via a communications network. The computing device 100 may also include one or more communication interfaces for exchanging data with other devices, such as via a network, direct connection, or the like, as discussed above. The communication interfaces can facilitate communications within a wide variety of communication networks and/or protocol types, including wired networks (e.g., LAN, cable, etc.), wireless networks (e.g., WLAN, cellular, satellite, etc.), the Internet, or a combination thereof. Communication interfaces can also provide communication with external storage (not shown), such as in a storage array, network attached storage, storage area network, or a combination thereof.

In various embodiments the computing system 100 including the one or more processors 142 and the one or more GPU(s) 144 may be a single/dual processor desktop system, a multiprocessor workstation system, or a server system having a large number of processors 142 or processor cores. In one embodiment, the system 100 is a processing platform incorporated within a system-on-a-chip (SoC) integrated circuit for use in mobile, handheld, or embedded devices.

In some embodiments, the computing system 100 may be a server-based gaming platform, a game console, including a game and media console, a mobile gaming console, a handheld game console, or an online game console. In some embodiments computing system 100 is a mobile phone, smart phone, tablet computing device or mobile Internet device. In various embodiments, the computing system 100 can also include, couple with, or be integrated within a wearable device, such as a smart watch wearable device, smart eyewear device, augmented reality device, or virtual reality device.

In some embodiments, the one or more processors 142 each include one or more processor cores to process instructions which, when executed, perform operations for system and user software. Among other capabilities, the one or more processor(s) 142 may be configured to fetch and execute computer-readable instructions stored in the memory 120, mass storage devices, or other computer-readable media.

Memory 120 is an example of computer storage media for storing instructions which are executed by the one or more processor(s) 142 to perform the various functions described below. For example, memory 120 may generally include both volatile memory and non-volatile memory (e.g., RAM, ROM, or the like). Further, mass storage devices (not shown) may generally include hard disk drives, solid-state drives, removable media, including external and removable drives, memory cards, flash memory, floppy disks, optical disks (e.g., CD, DVD), a storage array, a network attached storage, a storage area network, or the like. Both memory 120 and mass storage devices 812 may be collectively referred to as memory or computer storage media herein, and may be a non-transitory media capable of storing computer-readable, processor-executable program instructions as computer program code that can be executed by the processor 142 as a particular machine configured for carrying out the operations and functions described in the implementations herein.

Memory 120 may store a pre-processing module 122 and image data 134. The pre-processing module 122 may be configured to process one or more images received as input, via the I/O devices 154, for example, and/or from a database storing the image data 134, and generate one or more rendering assets for performing physically-based photo realistic rendering as discussed further below. Thus, the pre-processing module 122 may include instructions for processing the one or more images and generating the one or more rendering assets, which may be used for rendering one or more subjects in the images under any desired lighting condition, any desired angle, with any desired expression, and/or with any desired visual effects. The one or more rendering assets that may be generated via the pre-processing module include one or more of a normal map, a displacement map, a high-frequency normal map based on the displacement map, an albedo map, and a three-dimensional geometry mesh based on the one or more images.

Accordingly, in one embodiment, the pre-processing module 122 may be configured to generate one or more of the normal map, the displacement map, the high-frequency normal map, and the albedo map based on the one or more images for performing physically-based photo-realistic rendering. In another embodiment, additionally or alternatively, the pre-processing module 122 may be configured to generate a three-dimensional geometry mesh corresponding a subject in the one or more images for performing physically-based photo-realistic rendering.

Memory 120 may store a skin reflectance module 124. The skin reflectance module 124 may include one or more neural network models, each neural network model comprising a plurality convolutional layers. In one example, the skin reflectance module may include a first neural network model (also referred to herein as BRDF material network or material network) for generating skin reflectance features or representations. The skin reflectance module 124 may further include instructions for implementing the first neural network model to receive one or more encodings based on the one or more rendering assets and output a set of skin reflectance representations, the set of skin reflectance representations comprising one or more of scattering and roughness representations. The one or more encodings may be generated according to the three-dimensional geometry mesh and a given camera angle. Accordingly, the pre-processing module 122 may be configured to generate the one or more encodings (e.g., ray directional encodings and/or sample encodings) based on the three-dimensional geometry and the camera angle.

Memory 120 may further store a volumetric light map generation module 126. The volumetric light map generation module 126 may include a second neural network (also referred to herein as volumetric light map network) for generating a set of representations including spherical harmonic representations that model indirect light behavior based on a desired lighting condition. The volumetric light map generation module may comprise a set of instructions for implementing second neural network to output a volumetric light map comprising a set of indirect light representations that model indirect light behavior. The first neural network model and the second neural network model are part of a method discussed herein and will be described further below at FIGS. 2, 3, 5A and 5B.

Memory 120 may further store a rendering module 128 that includes instructions for generating a volumetric neural radiance field based on one or more of the skin reflectance representations from the first neural network, the volumetric light map from the second neural network, and the one or more rendering assets. Further, the rendering module 128 may store further instructions for rendering photo-realistic images based on the volumetric neural radiance field.

Memory 120 may further store a training module 130, which comprises instructions for training one or more neural network models stored in the pre-processing module 122, the skin reflectance module 124, and/or the volumetric light map generation module 126. In some embodiments, the training module 130 includes instructions for implementing one or more gradient descent algorithms, applying one or more loss functions, and/or training routines, for use in adjusting parameters of one or more neural network models of pre-processing module 122, the skin reflectance module 124, and/or the volumetric light map generation module 126. In at least one embodiment, the training module 130 can select an appropriate model or neural network to be used, if not specified by the request, and can train a model using relevant training data.

Figure 1B:
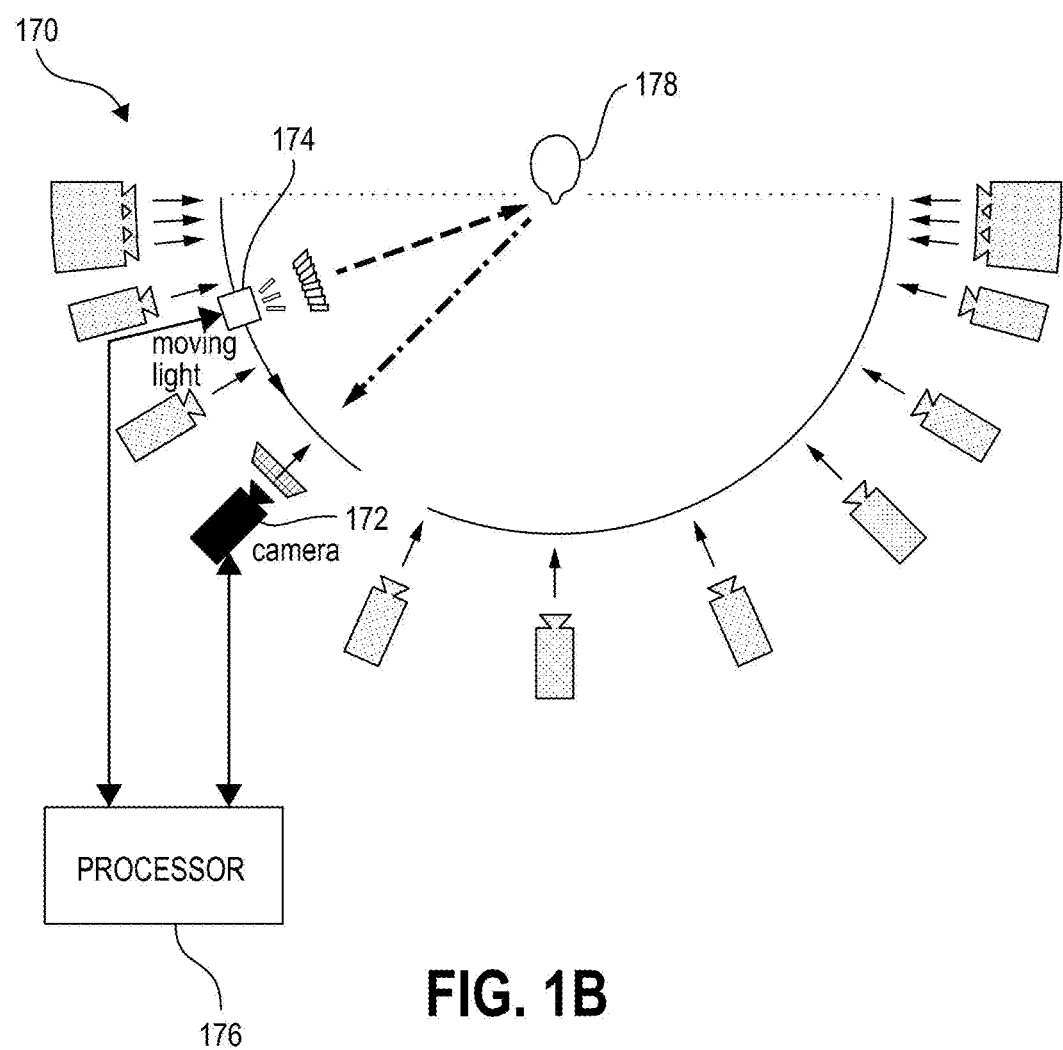
FIG. 1B shows a block diagram of a light stage system, according to one or more embodiments of the present disclosure.

In one embodiment, the one or more neural network models discussed herein may be trained using a training dataset generated based on a light stage system, such as a lightstage system 170 shown in FIG. 1B. Referring to FIG. 1B, light stage system 170 comprises one or more light source(s) 172, one or more camera(s) 174, and one or more processor(s) 176. The light stage system 170 may further comprise a platform (not shown), on which an object or a subject 178 can be positioned. The one or more light source(s) 172 may be configured to illuminate the subject and/or the object 178 with a controllable field of illumination using threshold-order (e.g., up to 5th order) Spherical Harmonics (SH) or Fourier Series (FS) illumination patterns. The one or more light sources 172 may include one or more driver circuits (not shown) that can drive the light source with modulated signals to generate the controllable field of illumination. The control signals may be generated by the one or more processor(s) 176 or one or more other processors of a computing system, such as processor 142 of computing system 100, in communication with the light stage system. In one example, the lightstage system 170 and the computing system 100 may be communicatively coupled via a communications network 156, which may be a wired network, a wireless network or a combination thereof.

The camera(s) 174 may capture one or more images of the object and/or the subject while the object and/or the subject is being illuminated by the controllable field of illumination of the light source 172. The platform may rotate the object with various rotation angle steps to allow the object and/or the subject to be seen by the camera(s) 174 at desired angles. The processor 176 can process the images of the object to extract reflectance properties of the object including an albedo, a reflection vector, a roughness, or anisotropy parameters of a specular reflectance lobe associated with the object and/or the subject, and/or other specular and/or diffuse parameters of the object and/or the subject.

In one or more implementations, the one or more light source(s) 172 may include a source assembly, such as an arc-shaped source assembly formed to have a semi-circular or polygon arc shape. The arc-shaped source assembly may include multiple light emitting elements such as light-emitting diodes (LEDs) and a number of optical components (e.g., optical lenses) that can focus the light-emitting elements towards a center of the arc-shaped source assembly, as descried in more details herein. The source assembly can rotate around the object and/or the subject to sweep a partial sphere surface or a full sphere surface around the object and/or the subject. The driver circuits can perform fine-grained intensity control over the LED-based lighting to enable image-based lighting with very high resolution HDR lighting environment.

To digitize the reflectance properties of flat material samples (e.g., leather, cloth, car paint, brushed and/or stamped metal) one can create a planar variant of the source assembly. For these applications, the light source(s) 172 may include a linear array of light-emitting elements, such as LEDs that is configured to scan the object by moving along an axis perpendicular to the axis of the linear array light source. During a scan, the LEDs may be driven by the driver circuits with modulating signals to create desired planar patterns of illumination.

In some aspects, the light source(s) 172 may include a flat panel light source that can display multiple frequency patterns. Examples of the flat panel light source may include a video display such as a liquid-crystal display (LCD), an organic LED (OLED) screen, or other flat panel displays. In some aspects, the light source(s) 172 may be in the form of a closed surface such as a dome, a sphere, or any other closed surface.

In one embodiment, the lightstage system 170 is utilized to acquire multiview images with a plurality of monochrome Ximea machine vision cameras and a plurality of color Ximea cameras, where monocolor cameras focus on efficient capture with pore-level details in geometry, albedo and specular reflectance reconstruction. Thus, the lightstage system 170 provides pore-level accuracy for generating rendering assets. Under all-white lighting condition, lightstage captures multiview images. Also, by given different illumination colors, RGB reflection of the scanned material can be recorded and combined as reference ground truth. With reconstructed assets, camera calibration, and all-white baked environmental texture, ray-based rendering may be performed under all white, matching the environment of capture and training on combined color images. The lightstage system may be utilized for acquiring ground truth images which may be used to generate one or more training datasets for training the first and/or the second neural networks. In another example, the images acquired via the lightstage system 170 may be augmented and rendered under different environmental lighting condition, which is then used for training the one or more neural networks described herein. In this way, the lightstage system 170 may be used for generating a training dataset comprising lightstage-scanned and/or augmented multi-view images. The lightstage trained neural network models provide efficient and improved photo-realistic renderings as discussed further below.

Memory 120 also stores an inference module 132 that comprises instructions for validating and testing new data with the one or more trained neural network models.

In some embodiments, the memory 120 may include components disposed at two or more devices, which may be remotely located and/or configured for coordinated processing. In some embodiments, one or more aspects of the memory 120 may include remotely-accessible networked storage devices configured in a cloud computing configuration.

The term "module," as used herein generally represents software, hardware, or a combination of software and hardware that can be configured to implement prescribed functions. For instance, in the case of a software implementation, the term "module," can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

It will be appreciated that the computing system 100 shown herein is illustrative and that variations and modifications are possible. For example, the connection topology, including the number and arrangement of bridges, the number of processor(s) 142, and the number of GPU(s) 144, may be modified as desired. Some of the particular components shown herein are optional and may not be included in all implementations of the computing system 100. For example, any number of add-in cards or peripherals may be supported, or some components may be eliminated. FIG. 1A illustrates an example configuration of a computing system 100 and environment that can be used to implement the modules and functions described herein. In some examples, a computing system, such as a server may include an architecture that is similar to the computing system 100, and may be configured for implementing the rendering methods described herein at FIGS. 2, 3, 4, 5A and 5B.

Rendering Pipeline

Figure 2:
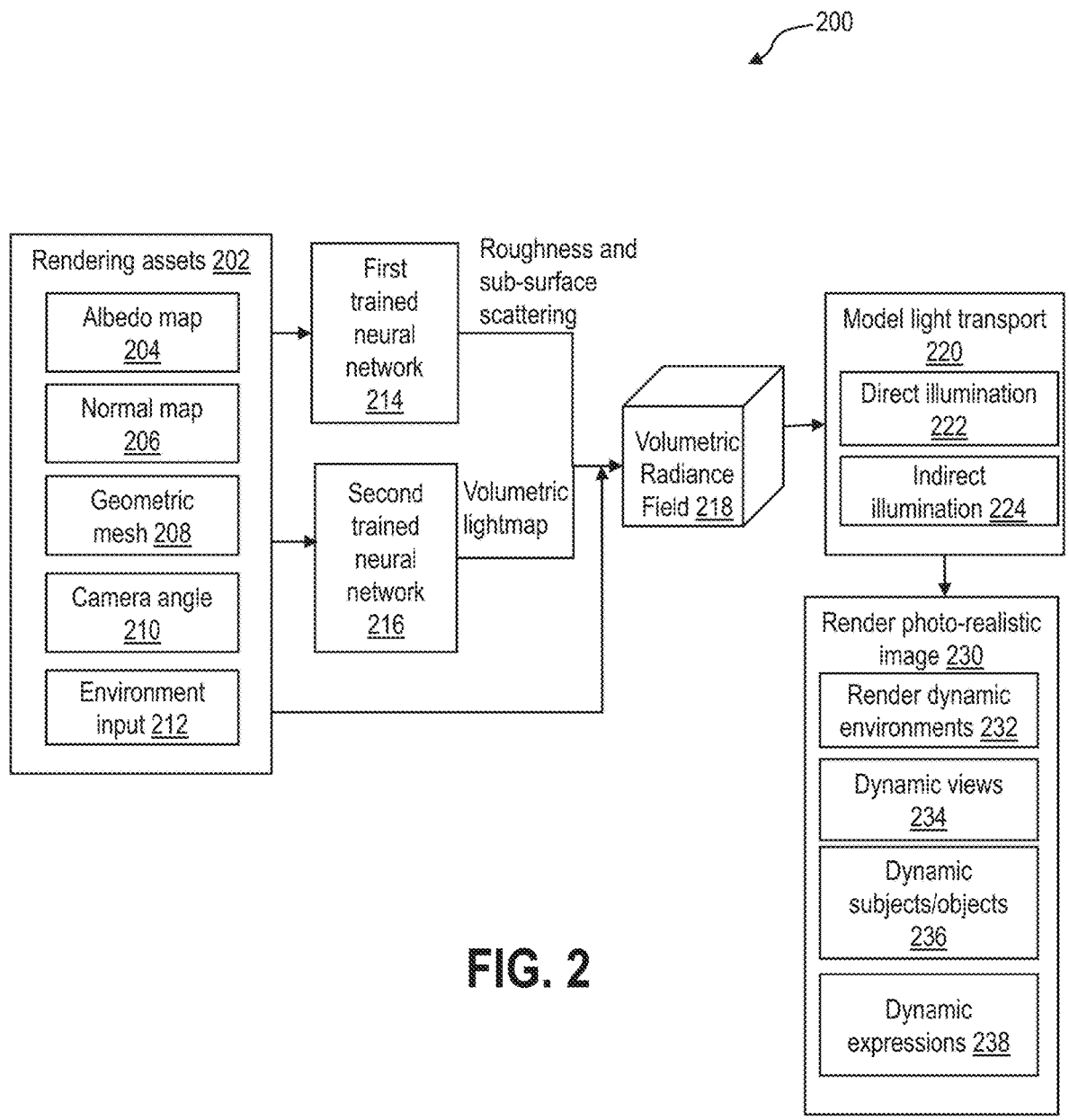
FIG. 2 shows a block diagram of an example rendering pipeline, according to one or more embodiments of the present disclosure.

FIG. 2 is a block diagram illustrating a high-level method 200 for rendering photo-realistic images (also referred to herein as "rendering pipeline") according to physically-based rendering. The method 200 may be implemented by one or more processors of a computing system, such as the one or more processor(s) 142 at FIG. 1A, based on instructions stored in memory of the computing system, such as memory 120 at FIG. 1A, for rendering photo-realistic images of a subject via a display portion of a user interface. For example, the method 200 may be utilized for physically-based photo realistic rendering of one or more subjects, such as humans, under any desired lighting condition. In some examples, additionally or alternatively, the method 200 may be utilized for physically-based photo realistic rendering of one or more anatomical structures of the one or more subjects, such as human faces, under any desired lighting condition. In some examples, additionally or alternatively, the method 200 may be utilized for physically-based photo realistic rendering of one or more objects and/or structures. Further, in some examples, additionally or alternatively, the method 200 may be utilized for rendering one or more subjects and objects at different camera angles. While the method 200 is described herein with respect to rendering of a human as a subject and more particularly to rendering of human faces, it will be appreciated that the method 200 may be implemented for rendering of any anatomical portion (e.g., hands, legs, etc.) of any subject, entire body of any subject, one or more objects and structures, and any combination thereof. As used herein, "subject" refers to a living organism, which includes but not limited to humans, non-human animals, plants, etc.

The method 200 takes as input, one or more rendering assets 202 corresponding to one or more digital images including a subject. Each of the one or more digital images may comprise different views of the subject (front view, left-front perspective view, right-front perspective view, etc.), for example. The one or more rendering assets 202 include one or more of an albedo map 204 of the subject in the image, a normal map 206 of the subject in the image, a three-dimensional geometric mesh 208 of the subject in the image, a desired camera view angle 210, and a desired environmental input 212 including a lighting information. In one example, the one or more rendering assets 202 may be automatically generated via a pre-processing pipeline using the one or more digital images. Details of the pre-processing pipeline will be discussed further below at FIGS. 3, 5A, and 5B. Briefly, the pre-processing pipeline may include generating one or more of the normal map 206, the albedo map 204, and the three-dimensional geometry 208 of the subject in the image. In some examples, some of the rendering assets may be automatically generated (e.g., albedo map, high-frequency normal map), while the remaining rendering assets (e.g., geometric mesh) may be input by the user. Further, the desired environmental input 212 (e.g., a high dynamic range imaging (HDRI) environmental map) and the desired camera view angle 210 may be received as inputs from the user.

Further, via a first trained neural network 214, a volumetric skin reflectance field is generated based on the three-dimensional geometric mesh 208 and the camera view angle 210. In particular, the first trained neural network 214 outputs skin features including roughness and sub-surface scattering for each volumetric sample location on the three-dimensional geometry based on a plurality of ray directions and a plurality of ray samples as input. The first neural network is also referred to herein as material network. Simultaneously, a second trained neural network 216 models indirect light behavior for each volumetric sample location of the three-dimensional geometry of the subject. The output of the second trained neural network 216 is a volumetric light map that models indirect light transport, which maps volumetric sample locations to spherical harmonics for each location. That is, each volumetric sample location in the output volumetric map correspond to a plurality of local spherical harmonic coefficients that model indirect light behavior. The volumetric light map is based on the environmental input 212, which includes a desired lighting condition. Thus, the lighting information including indirect lighting information for rendering the subject is obtained via the volumetric light map. Further, as will be discussed in more detail below at FIG. 6, a direct lighting distribution is also taken into account for rendering the subject. The second neural network is also referred to herein as volumetric light map network.

Next, the method 200 comprises generation of a volumetric neural radiance field 218 based on one or more of the volumetric skin reflectance map from the first trained neural network 214, the volumetric light map from the second trained neural network 216, direct illumination features from the environmental input 212 (e.g., HDRI map), the albedo map 204, and the surface normal map 206.

Next, using the neural radiance field 218 and by modeling direct as well as indirect light transport for a given lighting condition, one or more photo-realistic images of the subject is rendered via a display portion of the user interface. In various implementations, rendering photo-realistic images comprises rendering one or more variations of the subject. The one or more variations include but not limited to variations in illumination of the subject based on a desired environment and/or lighting condition (rendering the subject under different lighting conditions), variations in a camera angle, variations in an expression of the subject (that is, rendering various expressions of the subject), variation of the subject (that is, changing subjects), visual effects on the subject, and any combination thereof. Thus, rendering photo-realistic images comprises one or more of rendering the subject under dynamic environments (232), rendering dynamic views of the subject (234), rendering dynamic subjects and/or object (236), and rendering dynamic expression (238).

In this way, by implementing a method using trained neural networks for modeling roughness, sub-surface scattering, and indirect light transport, the rendered image is obtained with highly-detailed material properties, sub-surface properties, and light interaction is incorporated into the final rendering. As a result, the rendering pipeline described herein is configured to render production-level quality with pore-level details in a device and platform agnostic manner. Further, the method is configured to vary lighting conditions and render one or more subjects under different lighting conditions efficiently with reduced rendering time. Further still, the method is configured to enable subject change for a given lighting condition and also relight after a subject change. Further still, local illumination changes may be effectively modelled. Thus, when a subject moves from a less illuminated area to a more illuminated area under a given lighting condition, the method 200 through efficient and accurate modelling of direct and indirect light transport, as well as material properties, renders the subject with improved speed and quality. As a result, the method 200 can be effectively implemented for moving subjects and/or objects. Consequently, the method 200 provides significant improvement in rendering speed and quality, which in turn reduces production cycle and reduces costs.

Figure 3:
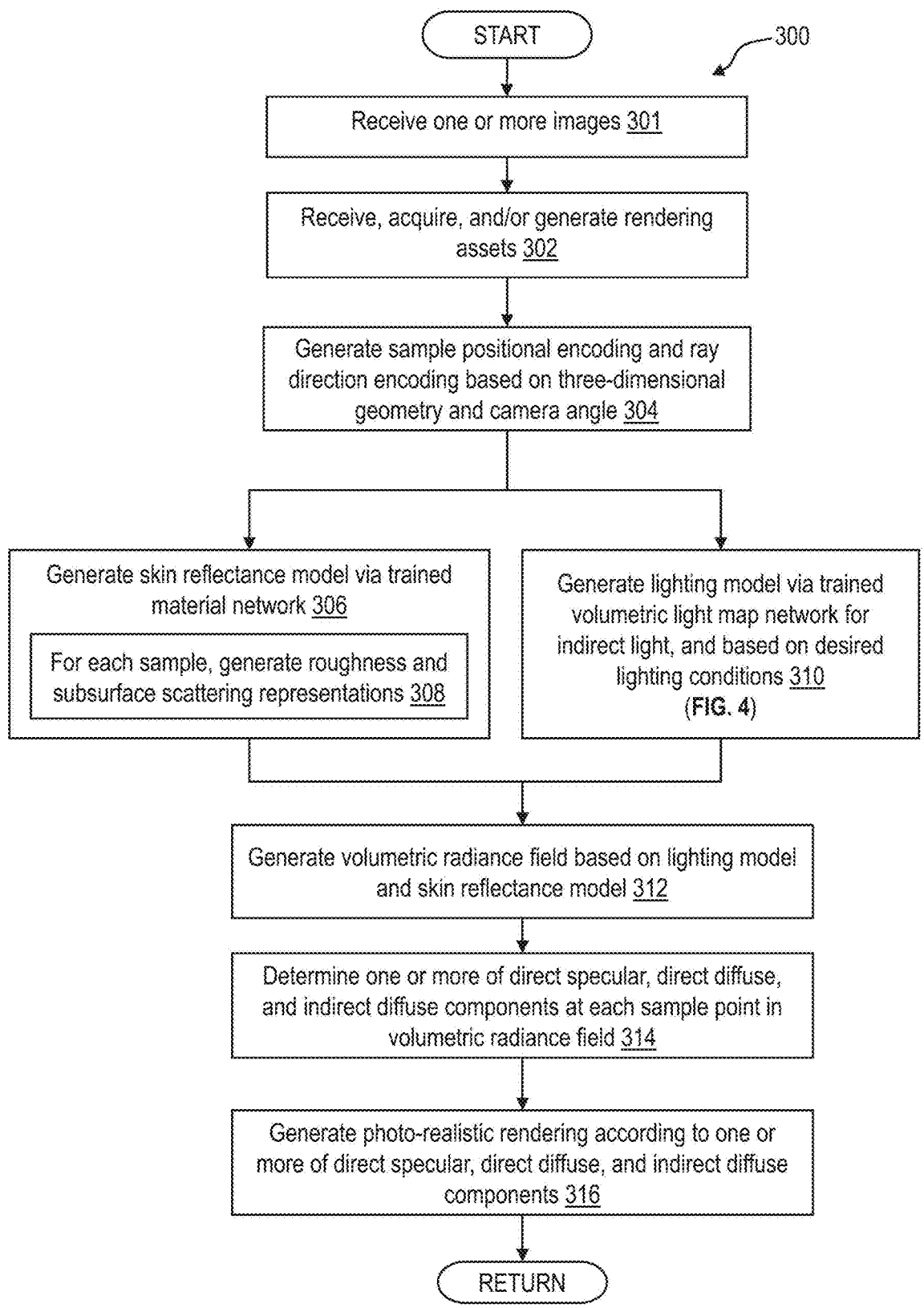
FIG. 3 shows a flow chart illustrating a high-level method for rendering one or more images, according to one or more embodiments of the present disclosure.

Turning to FIG. 3, it shows a flow chart illustrating a high-level method 300 for rendering a photo-realistic image of a subject based on physically-based rendering, according to an embodiment of the disclosure. The method 300 and the other methods described herein may be implemented by one or more processors of a computing system, such as one or more processor(s) 142 at FIGS. 1, based on instructions stored in memory of the computing system, such as memory 120 at FIG. 1. Further, the memory stores a first neural network, such as first neural network 214, configured to output a set of reflectance representations comprising roughness and scattering information for surface and subsurface properties of the subject, and stores a second neural network, such as second neural network 216, configured to output a volumetric light map comprising a set of indirect light representations corresponding to indirect light behavior.

The method begins at 301. At 301, the method 300 includes receiving one or more digital images of a subject for rendering one or more photo-realistic images of the subject. In one example, the method 300 may receive the one or more images via a camera or receive as input an image from a database stored in memory. In one example, a single image may be used for subsequently generating one or more rendering assets, which are then input into a method. In another example, more than one image may be used for subsequently generating the one or more rendering assets. For example, a set of images of the subject may be used, where each of the set of images correspond to a different view. As a non-limiting example, the one or more images may comprise a front view, a front-left view, and front-right view of the subject.

Next, at 302, the method 300 includes receiving, acquiring, and/or generating one or more rendering assets corresponding to the one or more input images. The one or more rendering assets include an albedo map, a normal map, a three-dimensional geometric mesh, a desired environment input including a desired lighting condition, and a desired camera view angle. In some examples, the one or more rendering assets are directly used as input into the rendering pipeline that includes the material and volumetric networks.

In one example, the method 300 includes generating the albedo map from the one or more input images. The albedo map of the subject may be automatically generated, via an albedo map generation logic, for example. As used herein, the term "logic" refers to computer program logic used to provide the specified functionality. Thus, logic can be implemented in hardware, firmware, and/or software. In one embodiment, logic is stored in a permanent storage, loaded into random access memory, and executed by a processor. Alternatively, the method 300 may receive the albedo map as an input from the user.

Figure 11A:
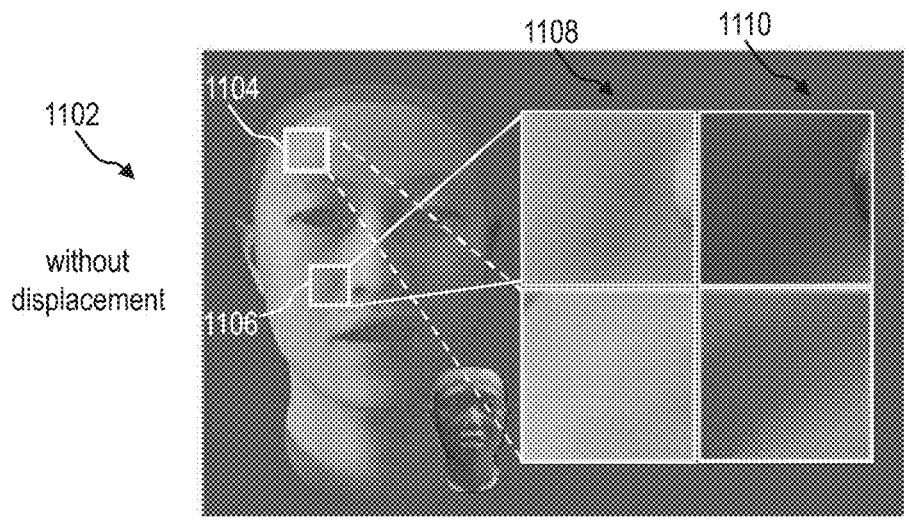
FIG. 11A shows an example image rendered with a normal map without displacement, according to one or more embodiments of the present disclosure.

Further, the method 300 includes generating a normal map or a high-frequency normal map using the one or more input images. The normal map of the subject may be automatically generated using the one or more input images, via a normal map generation logic, for example. In one example, generating the normal map or the high-frequency map includes generating the normal map or the high-frequency map from a displacement map. Thus, in one example, the normal map is a high-frequency normal map, where the high-frequency normal map is based on a displacement map of the one or more input images. In another example, the normal map may be received as input, and a high-frequency normal map may be generated based on the normal map and a displacement map generated from the one or more images. In any case, the high-frequency normal map thus comprises displacement embedded in UV space. The high-frequency normal map with displacement information enables rendering of a subject or an anatomical portion of the subject (e.g., face) with pore-level details. Example renderings with and without high-frequency normal map (that is with and without displacement) is shown at FIGS. 11A and 111B. As shown, utilizing high-frequency normal maps improve rendering quality by providing rich pore-level details and enhancing photo-realistic shading effect during the rendering.

Further, the three-dimensional geometric mesh may be automatically generated using the one or more input images, via a geometry generation logic, for example.

In some examples, a pre-processing module may be utilized comprising one or more of the albedo generation logic, the normal map generation logic, and the three-dimensional geometry generation logic. The pre-processing module may receive the one or more input images and output one or more of a corresponding albedo map, high-frequency normal map, and three-dimensional geometric mesh.

Further, the desired lighting condition and the desired camera angle for rendering photo-realistic images may be received according to user input.

Next, at 304, the method 300 includes generating sample position encodings and ray direction encodings based on the three-dimensional geometric mesh and the desired camera angle. The sample position encodings and the ray direction encodings are based on a plurality of camera rays intersecting with the geometric mesh. In particular, encodings for ray direction and ray sample (that is, points in the three-dimensional mesh along the ray direction) are generated using sample position and ray direction as input. The ray direction encodings and the sample position encodings map the input coordinates (three-dimensional coordinates of each sample in the three-dimensional geometric mesh of the subject and corresponding ray direction) to higher dimensional space. This mapping generates high-frequency sample positional and ray directional encodings, which enable highly-detailed renderings. The sample positional encodings and the ray directional encodings are then utilized to generate a volumetric neural radiance field, as discussed below.

In particular, at 306, the method 300 includes generating a volumetric skin reflectance field via a first neural network (that is, material network or skin reflectance network), such as the first neural network 214, using the sample positional encodings and the ray directional encodings as input. The volumetric skin reflectance field comprises roughness and scattering representations for each sample in a volumetric field (as indicated at 308). In parallel, at 310, the method 300 includes generating a volumetric light map via a second neural network (that is, volumetric light map network), such as second neural network 216, using the sample positional encodings and the ray directional encodings as input along with a desired lighting input (e.g., HDRI light probe). The volumetric light map network comprises spherical harmonic representations for each sample in the volumetric field. Additional details of generating the volumetric light map is described below at FIG. 4. Further, the first and the second neural networks are trained using a training dataset comprising a set of lightstage all-white scanned images and a set of lightstage multi-view light augmented images, as discussed below.

Training Dataset and Training

The training dataset includes a plurality of images for each subject, wherein the plurality of images includes a first set of lightstage captured imagery and a second set of synthesized images rendered under different lighting conditions. The first set of lightstage captured images is acquired via a lightstage system. The first set of lightstage images comprises a plurality of expressions for each of a plurality of subjects under all-white illumination conditions. The second set of synthesized images comprise images rendered under different environmental light probes and with multiple views, including a frontal view, for each image of a subject.

Figure 10A:
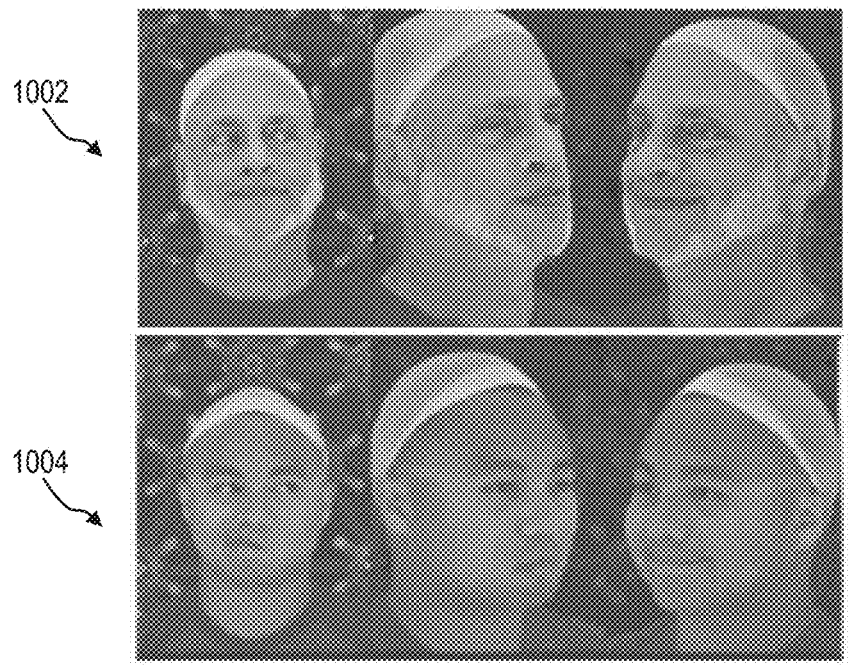
FIG. 10A shows an example set of images used for training one or more neural networks, according to one or more embodiments of the present disclosure.
Figure 10B:
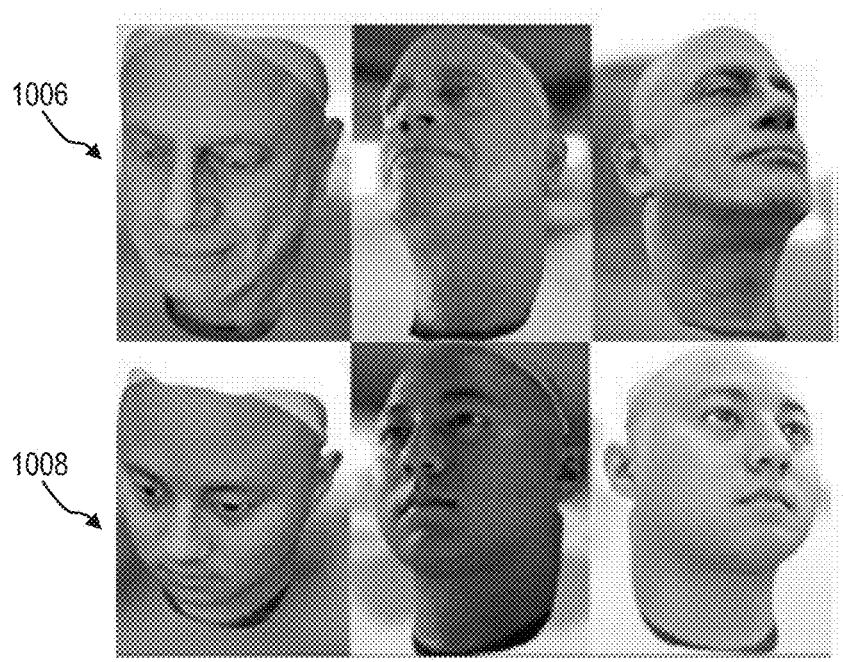
FIG. 10B shows an example set of images with light augmentation used for training one or more neural networks, according to one or more embodiments of the present disclosure.

An example training dataset is shown at FIGS. 10A and 10B. Referring to FIG. 10A, it shows lightstage images of multiple expressions under all white illumination for a first subject (row 1002) and a second subject (row 1004). FIG. 10B shows synthetic multiview images rendered by Maya Arnold under multiple environmental illumination for the first subject (row 1006) and the second subject (row 1008). In particular, to increase light diversity, captured facial assets are rendered under different HDRI environment maps using Maya Arnold with handcrafted face shader by artists. Due to variance in different skin types (roughness, oiliness, color) and different geometries (wrinkle, facial hair), artists manually tweaked shaders for every single subject covering diverse genders, age groups, and skin colors to achieve a more general augmentation. To achieve the highest synthetic rendering quality instead of fast yet lower quality rendering, a render farm comprising a plurality of computing devices to perform heavy CPU ray tracing rendering was implemented, which yielded significant quality improvement compared with fast GPU rendering, and removes HDRI environmental textures with extreme values leading to workable lighting augmentations.

During training camera rays are arbitrarily selected with its corresponding render assets including corresponding density value, texture values, environmental light probe and ground truth pixel color. With unpolarized and polarized lightstage scanned images, the first neural network is trained to predicting skin reflectance; while together with the lighting augmentation, the second neural network is trained to learn an indirect light volumetric light map that is flexible, robust, and subject-independent.

For each image, positional encodings and directional encodings are obtained. The encodings are sent through the first and the second neural networks with a plurality of RGB image representations. The output length of the second neural network (that is, volumetric light map network) is 12 for each queried 3D location while that of the first neural network (that is, material network) is 4 including one channel for skin roughness and 3 channels for skin subsurface scattering. Then, transport aggregation is performed to obtain a weighted value for each ray based on a density distribution among the sampled points along the ray, where the values of each component on rays are aggregated with introduced values from preprocessed albedo and normal maps, and then visualized as an image with pixels representing their intensities following a rendering equation (1) shown below. Finally, the rendered RGB values are constrained with ground truth pixel colors.

Next at 312, the method 300 includes generating a volumetric neural radiance field based on at least the volumetric skin reflectance field (obtained at 306) and the volumetric light map (obtained at 310). In particular, based on one or more input rendering assets, including the three-dimensional geometry, the albedo map, and the high-frequency map, a density field is generated based on an absolute depth of a sample to ray-mesh intersections, which is a distance from any sample to an intersecting point on the three-dimensional geometric mesh along a ray direction. Further, based on the density field, the volumetric skin reflectance field, and the volumetric light map, per-sample based shading is performed to generate the volumetric neural radiance field, which is then used to achieve photo-realistic rendering for any subject under any lighting condition.

Accordingly, at 314, the method 300 includes determining one or more of a direct specular component, a direct diffuse component, and an indirect diffuse component for each sample in the volumetric radiance field to model total light transport.

Next, at 316, the method 300 includes generating photo-realistic rendering according to the one or more of the direct specular component, the direct diffuse component, and the indirect diffuse component. In one example, the photo-realistic rendering of the subject may be obtained according to a rendering function that incorporates the one or more direct specular, direct diffuse, and indirect diffuse components. In one example the rendering equation is defined as:

$$L_o(x \rightarrow \omega_o) = \int_\Omega f_s(x, \omega_o, \omega_i) L_{direct}(x \leftarrow \omega_i) |\cos\theta_i| d\omega_i + \int_\Omega f_r(x, \omega_o, \omega_i) L_{direct}(x \leftarrow \omega_i) |\cos\theta_i| d\omega_i + \int_\Omega f_{is}(x, \omega_o, \omega_i) L_{indirect}(x \leftarrow \omega_i) |\cos\theta_i| d\omega_i \quad (1)$$

where $L_o(x \rightarrow \omega_o)$ is outgoing radiance leaving geometric location x in direction $\omega_o$, $L_i(x \leftarrow \omega_i)$ stands for incident radiance that arrives at x, $\theta$ is the angle between incident light direction $\omega_i$ and surface normal direction at x. Further, $f(x, \omega_o, \omega_i)$ is a bidirectional scattering distribution function (BSDF) that describes the appearance of a surface area centered at a point x when viewed from a direction $\omega_o$, illuminated by incident light from direction $\omega_i$, and $f_s$ is specular reflection, $f_r$ is diffuse reflection, and $f_{is}$ is subsurface scattering.

Figure 4:
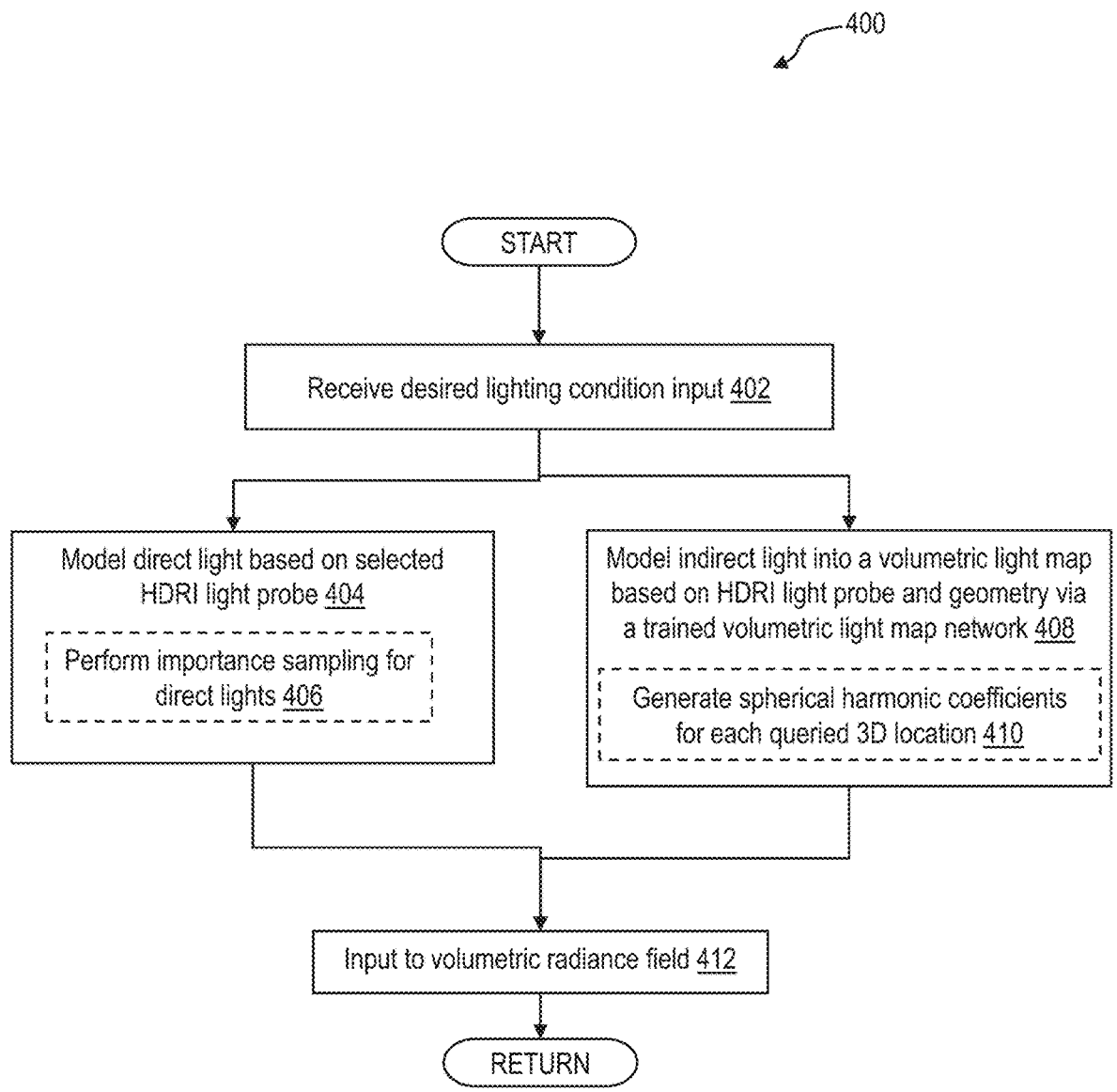
FIG. 4 shows a flow chart illustrating a high-level method for modeling direct and indirect light during rendering, according to one or more embodiments of the present disclosure.

Turning to FIG. 4, it shows a flowchart illustrating a high-level method 400 for determining direct and indirect light behavior for physically-based rendering of photo-realistic images under a given lighting condition, according to an embodiment. Previous physically-based rendering approaches employ ray-tracing to model the indirect reflection by tracking the path of each light ray from a pixel recursively until reaching a light source. The ray tracing approaches are time-consuming (e.g., hours to render a face with high resolution) and require artists as well as engineers to synthesize interaction of light with the materials rendered. As a result, production cycle is long and production costs are high. In order to address the above issues, the inventors herein provide a method for modelling direct and indirect light interactions with materials. In particular, indirect light interactions, which include subsurface scattering and subsurface bouncing for human skin, is modelled using a trained neural network that outputs a volumetric light map. While the present example will be described with respect to human face rendering and discusses light interaction with human skin, it will be appreciated that similar methods can be implemented for modeling light transport for non-human organisms, object, etc.

At 402, the method 400 includes receiving a desired lighting condition input. In one example, the desired lighting condition input may be based on an environment map, such as a HDRI map. For example, the user may select a desired HDRI map for illuminating a subject. As discussed above at FIG. 3, the desired lighting condition may be one of the rendering assets input into the method for photo-realistic rendering of the subject.

Figure 6:
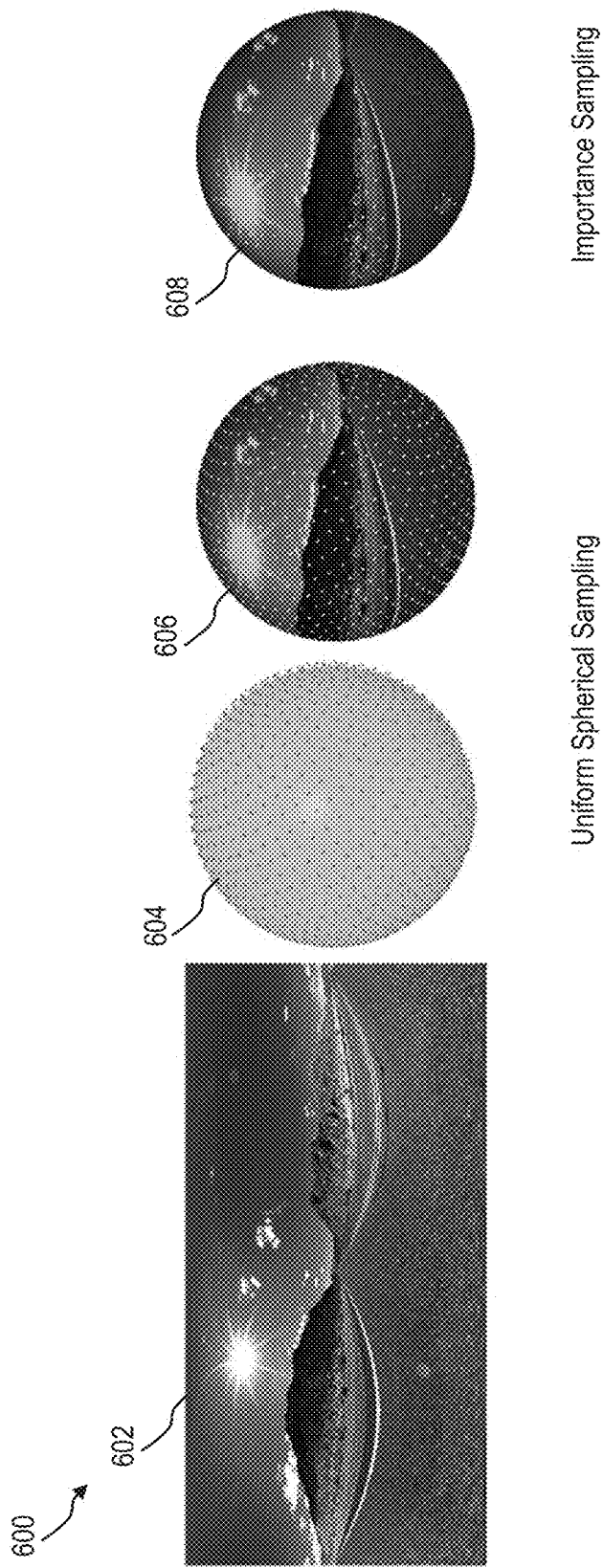
FIG. 6 shows an example global light sampling distribution, according to one or more embodiments of the present disclosure.

At 404, the method 400 includes modelling direct light based on the desired lighting condition, which may be based on a selected HDRI environment map, for example. In one example, the method includes generating a Sky-Dome representation of the direct light sources by projecting the HDRI environment map onto a sphere. Each pixel on the sphere is regarded as a distant directional light source. To model the light source, first, uniform sampling is performed with a plurality of points on the sphere having a uniform distribution. These points serve as the light source proposals. Then, valid candidates among the proposals are filtered considering two thresholds: an intensity threshold, which eliminates unnecessary computation from dark regions, and an importance threshold, which is computed from image saliency that prevents invalid light sources from textureless regions. Accordingly, the method 400 includes performing importance sampling to select a plurality of pixels from a sky-dome representation of an environment map, wherein the plurality of pixels is selected based on one or more of an intensity threshold and an importance threshold. In one example, the pixels are selected based on one or more of a corresponding pixel intensity greater than the intensity threshold and a corresponding texture greater than an importance threshold. An example of direct light sampling is illustrated at FIG. 6. Referring now to FIG. 6, it shows an illustration of importance sampling for modeling direct light behavior. An example HDRI map is shown at 602. Sky dome representations of the HDRI map are shown at 604, 606, and 608. At 604 and 606 uniform sampling is shown within plurality of points distributed evenly across the corresponding spheres. At 608, importance sampling of areas that have intensity greater than a threshold intensity and have importance greater than an importance threshold based on texture is shown. In this way, unnecessary computation from dark regions and/or textureless regions that do not contribute to light interaction with the subject is reduced.

Figure 7:
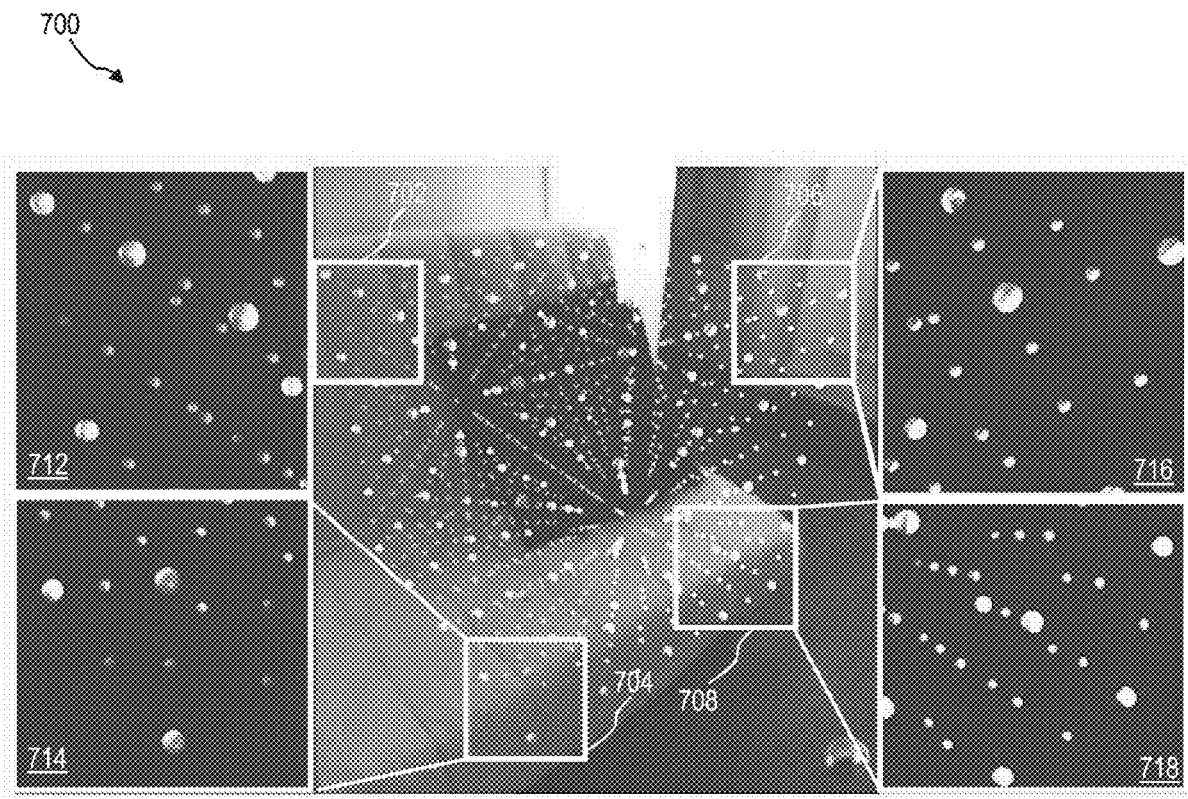
FIG. 7 shows an example light map visualization in 3D grid, according to one or more embodiments of the present disclosure.

Returning back to FIG. 4, at 408, in parallel or sequentially, the method 400 includes modeling indirect light by generating a volumetric light map based on the desired lighting condition and one or more rendering assets, including three-dimensional geometry and camera angle. In particular, a second trained neural network, such as neural network 216, takes sample positional encodings, ray directional encodings, and desired lighting condition (e.g., selected HDRI light probe) as input and outputs a volumetric light map comprising spherical harmonic representations for each three-dimensional sample of the volumetric light map. In one example, for each three-dimensional sample position is represented by 12 channel spherical harmonic coefficients modelling indirect light behavior for a given lighting condition. As discussed above with respect to FIG. 3, the second neural network is trained using an image dataset acquired from a lightstage system. Briefly, the training dataset includes a plurality of images for each subject, wherein the plurality of images includes a first set of lightstage scans and a second set of light augmented images rendered under different lighting conditions. The second trained neural network (that is, the volumetric light map network) is trained using the image dataset to output a volumetric light map corresponding to indirect radiance, the volumetric light map comprising spherical harmonic representations for each three-dimensional sample in the volumetric light map. An example visualization of a portion of the volumetric light map is shown at FIG. 7. Referring to FIG. 7, it shows the lightmap sampled in a grid of spheres and then computed surface color of each sphere from local spherical harmonic coefficients, it shows spherical harmonic representations in combination with density mapping. Enlarged portions of 702, 704, 706, and 708 are shown at 712, 714, 716, and 718 respectively. Various densities of sampling are used to bring to attention relevant regions with useful data for rendering.

Previous approaches for physically-based rendering use ray-tracing approaches to model the indirect reflection by tracking the bounce of each light ray from a pixel recursively until reaching a light source. Unlike a multi-bounce application, the human skin is a multilayered structure comprising thin oily layer, epidermis and dermis producing specular reflection, surface diffuse reflection and subsurface scattering. To avoid computational cost of tracing massive rays, spherical harmonics (SH) are utilized. In particular, the indirect radiance $L_{indirect}$ is modelled using volumetric light map according to local spherical harmonics, $$L_{indirect}(x \rightarrow \omega_o) = \Sigma_{l=0}^{n} \Sigma_{l=0}^{k} \Sigma_{m=-l}^{l} C_l^m Y_l^m (x \rightarrow \omega_o) \quad (2)$$

where n is the number of light samples, K is the highest order of spherical harmonics, $C_l^m$ is the encoded SH coefficient quantifying surrounding indirect radiance and $Y_l^m$ is the orthonormalized Laplaces's SH basis.

Figure 8:
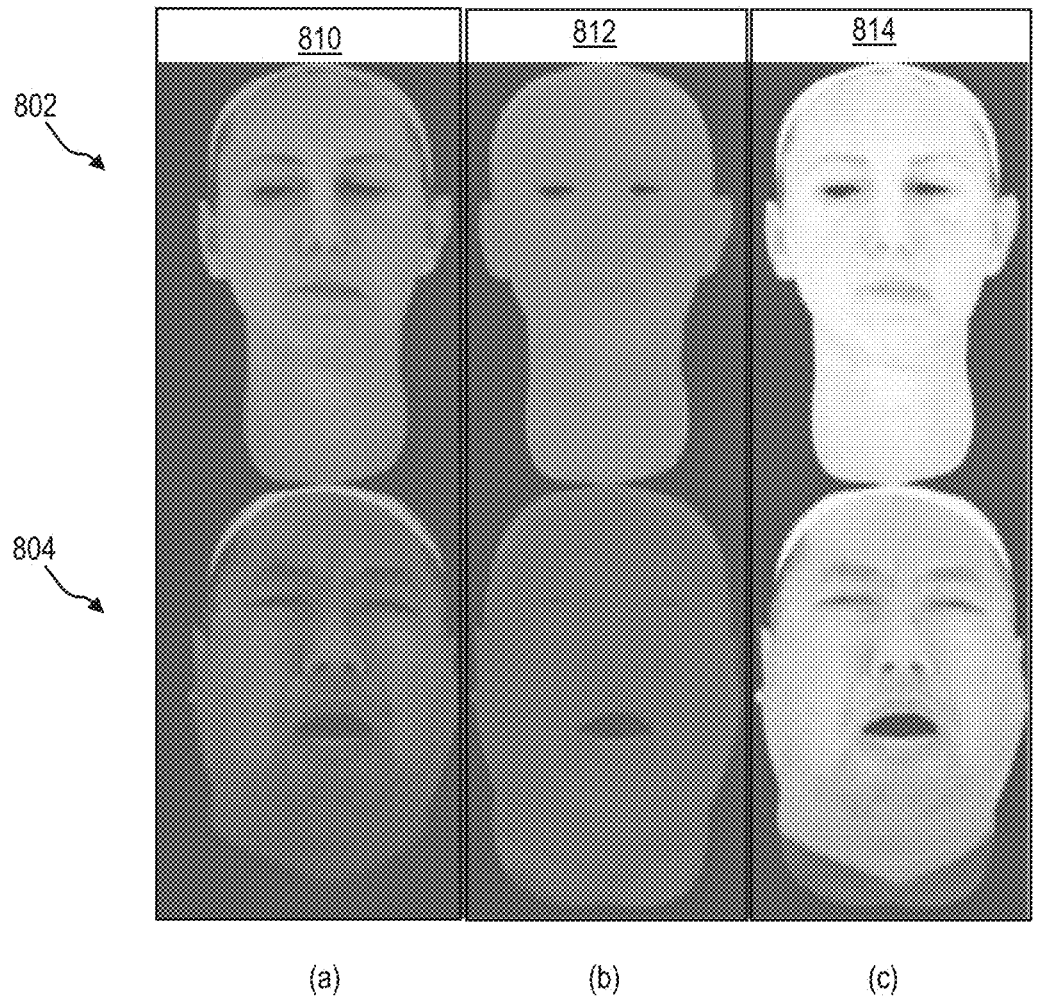
FIG. 8 shows example images including albedo, rendered indirect diffuse layer using volumetric lightmap, and final rendering, according to one or more embodiments of the present disclosure.

In this way, the volumetric light map is used to model unpredictable light transport underneath the skin including the subsurface bouncing and subsurface scattering in between material particles by employing local spherical harmonics to define indirect light $L_{indirect}$ for building indirect light transport $L_{id}$, which is provided by:

$$L_{id}(x \rightarrow \omega_o) = f_\Omega f_{ss}(x, \omega_o, \omega_i) L_{indirect}(x \leftarrow \omega_i) |\cos\theta_i| d\omega_i f_{is}$$
$$(x, \omega_o, \omega_i) = \alpha_{is} + \eta \quad (3)$$

where $\alpha_{is}$ is the measured diffuse reflection at the subsurface, scaled surface albedo a is used as an approximation, and $\eta$ is the skin scattering predicted from the first neural network (that is, the material network). In FIG. 8, intermediate results under all white illumination are shown. Referring now to FIG. 8, it shows the effectiveness of volumetric light map under all white illumination. In particular, input albedo is shown under column 810, subsurface scattering build from volumetric light map is shown under 812, and final rendering is shown under column 814. As evidenced, subsurface scattering presents the similar color patter of that from albedo but with less appearance of hairs including beard and eyebrows.

Returning back to FIG. 4, the volumetric light map obtained via the second neural network and the direct light importance sampling representations obtained from the HDRI map are then utilized along with skin reflectance output from the first neural network as well as high-frequency normal map and albedo map for generating a volumetric neural radiance field, which is then implemented for photo-realistic rendering, as discussed above. For example, the volumetric light map stores local spherical harmonic (SH) lighting coefficients at build-time and is called for color interpolation during rendering.

In this way, by generating a volumetric light map indirect light representations may be inferred for any lighting condition. As discussed above, the generated volumetric light map models indirect lighting according to spherical harmonics. In particular, when rendering human skin, the generated volumetric light map models subsurface scattering and subsurface bouncing. For example, under a given lighting condition, a thinner skin appears brighter and with a more reddish hue compared to thicker skin. Further, indirect light transport, such as scattering of light at a sub-surface level (e.g., underneath the skin), contributes to shadow softening. The generated volumetric light map models indirect light radiance with improved accuracy, which is then used to aggregate light transport for photo-realistic rendering. Further, volumetric light map also enables efficient and more accurate re-lighting of a subject under different lighting conditions.

Figure 5A:
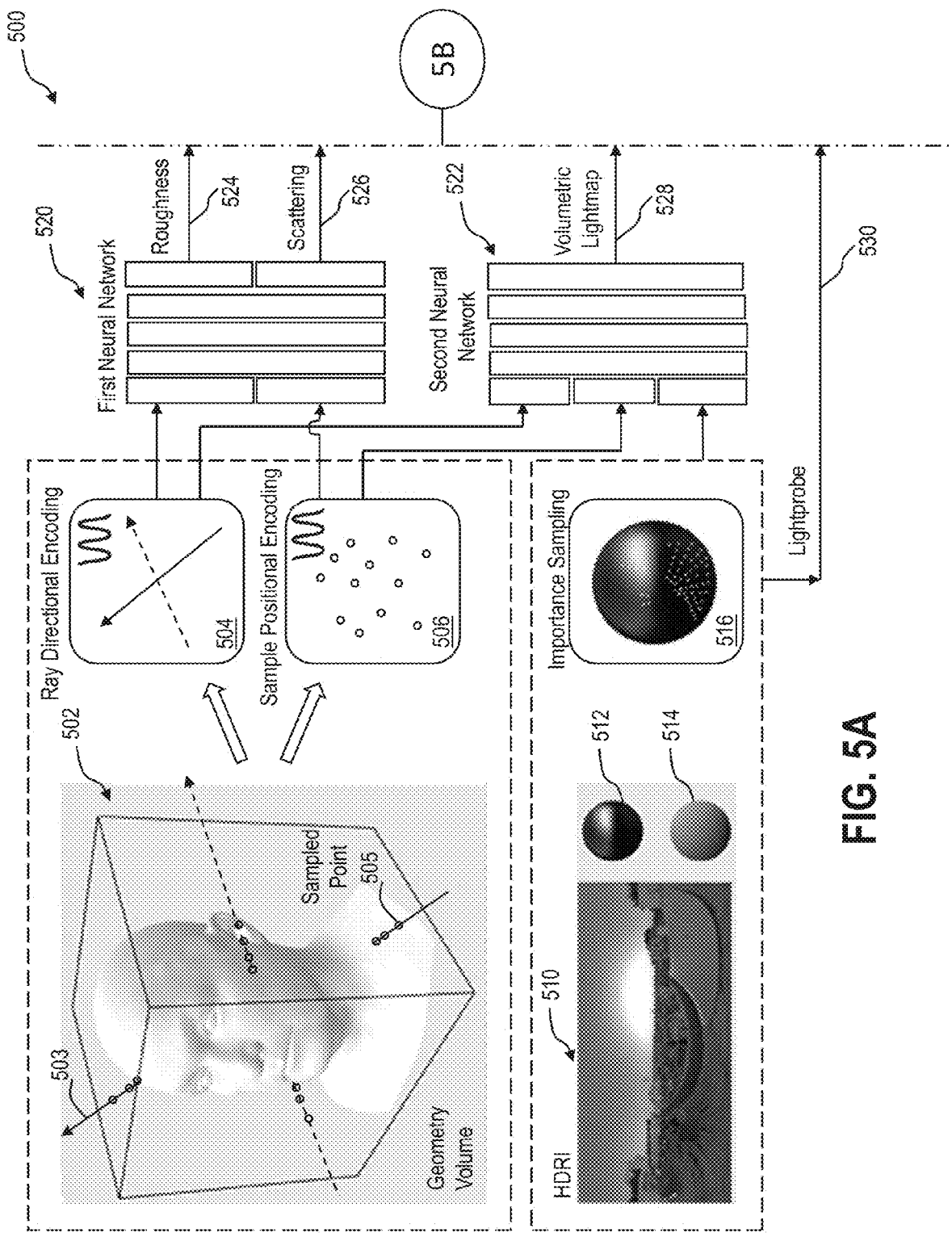
FIGS. 5A and 5B show a schematic illustration of a rendering architecture for rendering one or more images, where
Figure 5B:
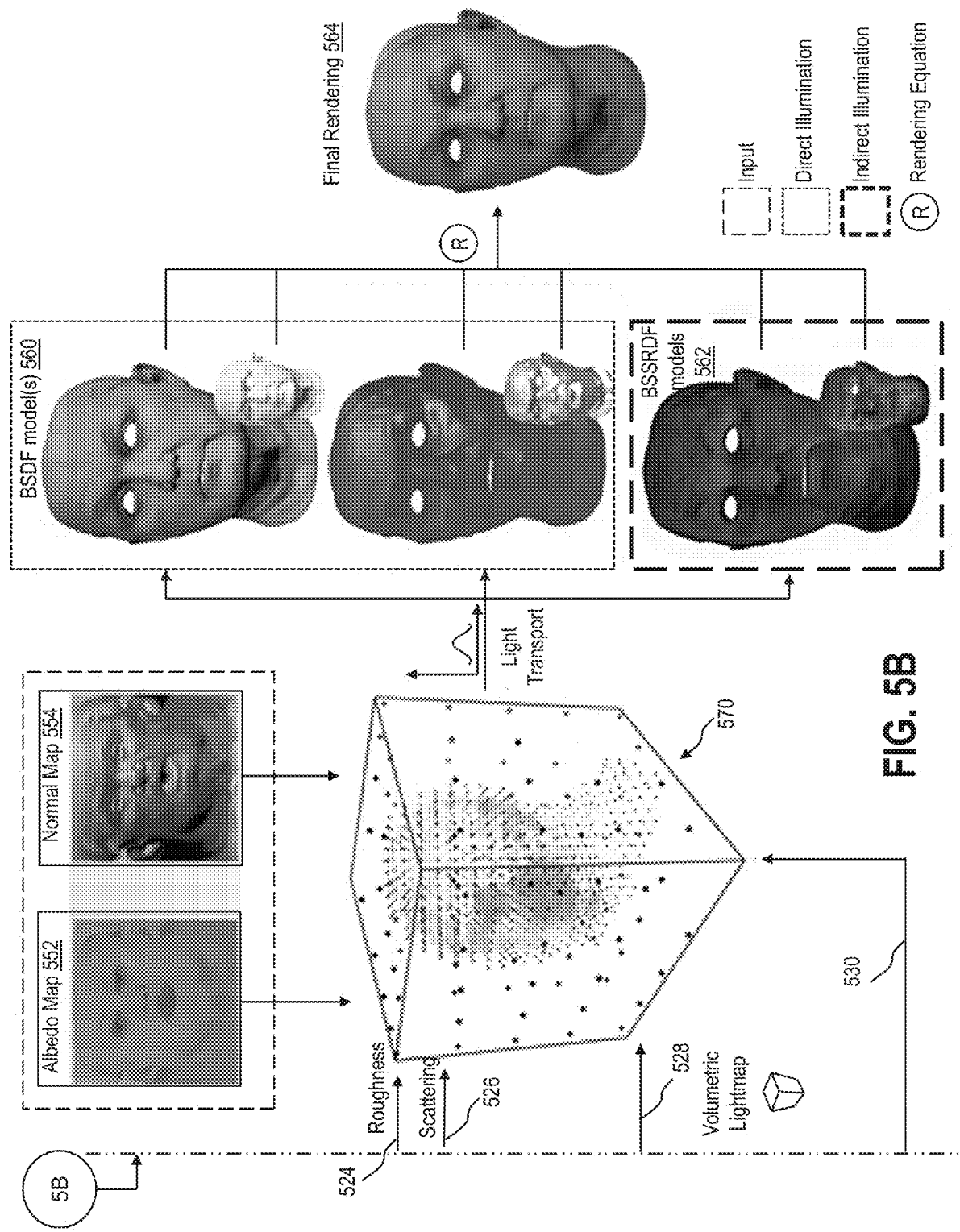

Turning now to FIGS. 5A and 5B, the figures show a schematic illustration of a method 500, according to an embodiment of the disclosure. FIG. 5B is a continuation of FIG. 5A, and will be discussed together below. The method 500 is an example of the method 200 discussed at FIG. 2. The method 500 may be implemented by one or more processors of a computing system, such as one or more processor(s) 142 FIG. 1A, based on instructions stored in memory of the computing system, such as memory 120 at FIG. 1A, for rendering photo-realistic images of a subject or an object via a display portion of a user interface. The method 500 may be utilized for physically-based photo realistic rendering of one or more subjects, such as humans, under any desired lighting condition.

The method 500 comprises a first neural network 520 trained to output skin roughness (524) and scattering (526) representations, and a second neural network 522 trained to output a volumetric light map 528 comprising indirect light representations (that is, spherical harmonic representations) for a given lighting condition. The first neural network 520 is similar to the first neural network 214 discussed above and the second neural network 522 is similar to the second neural network 216 discussed above. In one embodiment, the second neural network is a differentiable network.

The method 500 receives one or more rendering assets as input, the one or more rendering assets comprising a three-dimensional face geometry 502 of a subject, a desired camera angle, an albedo map 552, a normal map 554, and a desired environmental map 510 including a desired lighting condition. The method 500 takes the one or more rendering assets as inputs and models physically correct material and radiance field that are automatically learned from a training dataset comprising lightstage-scanned and augmented multi-view images. First, a set of ray directional encodings 504 and a set of sample position encodings 506 are generated based on the three-dimensional geometry 502 and desired camera angle. In one example, the three-dimensional face geometry 502 may be obtained using one or more input images of a subject. Using the three-dimensional face geometry 502 and the camera angle, a plurality of unprojected camera rays 503 are generated and ray-geometry intersection is performed to obtain ray-perspective density of sample points 505, which are used to obtain the ray directional encodings 504 and sample positional encodings 506.

The ray directional encodings 504 and sample positional encodings 506 are input into the first neural network 520 to obtain skin reflectance field comprising for each three-dimensional sample, a roughness representation and a scattering representation. Additionally, the ray directional encodings 504 and sample positional encodings 506 are input into the second neural network 522 along with importance sampling input 516 based on the environmental light map 510. Sky dome representations of specular and diffuse components of the light map 510 are shown at 512 and 514 respectively. Further, the importance sampling input 516 includes a set of importance sampled points based on intensity threshold and importance threshold (for texture). As discussed above, the second neural network 522 generates the volumetric light map 528 including indirect light representations for each three-dimensional sample.

The skin reflectance field output from the first neural network 520, the volumetric light map 520 output from the second neural network 522 are then integrated with the high-frequency normal map 554, the albedo map 552, and the importance sampled information (as indicated at 516) to generate a volumetric neural radiance field 570 of the subject under the selected lighting condition 570.

Using the skin reflectance volumetric field (from the first neural network 520) comprising representations of scattering and roughness at each sample, and a volumetric light map network (from the second neural network 522) predicting indirect light transport, per-sample based shading may be performed to generate volumetric radiance field 570 for any subject under any lighting condition.

With the current radiance model at each sample x, the accumulative radiance (x→$\omega_o$) using visibility $\tau_c$ and density $\sigma$ may be calculated to simulate the decay of the ray while transmitting, $$L(x \to \omega_o) = \int_o^\infty \tau_c(x(t)) \cdot \sigma(x(t)) \cdot L_x(x(t) \to \omega_o) dt \quad (4)$$

where $x(t) = c - t\omega_o$ represents the continuous geometry sampling along the light direction $\omega_o$, from camera center c, and local radiance at each sample $L_x$ is the combination of direct specular $L_{ds}$, direct diffuse $L_{dd}$, indirect diffuse $L_{ss}$ following the volumetric rendering equation:

$$L(x \to \omega_o) = L_{ds}(x \to \omega_o) + L_{dd}(x \to \omega_o) + L_{ss}(x \to \omega_0) \quad (5)$$

Density and Visibility Construction.
Density Field.

Because points close-to yet not-in the mesh should also receive a non-zero weight as density in radiance field, density $\sigma$ is defined by the following steps. With initialized geometry volume, exact distance from sampled point x to the intersection point with mesh along ray direction $\omega_o$ is determined. The distance is denoted as z(x). Then, centralized Gaussian is applied to compute density $\sigma$ from z.

Density is defined as $\sigma(x) = \alpha_\sigma \exp(-z(x)^2/(2 \cdot \delta^2))$, where $\alpha_\sigma$ is a constant density scalar and $\delta$ is standard deviation of the distribution.

According to the equation, the closer the sampled point to the mesh surface, the higher the density is. A small $\delta$ is used to keep the distribution narrow, which reduces contribution of samples far away from surface.

Visibility.

Visibility at each point is defined to model whether the point is visible from view direction $\omega_o$. Intuitively, visibility at a point is determined by three factors: 1) amount of illumination received, 2) opacity of the point, 3) occlusion by other points on the ray before. Because a density field is constructed to directly compute 1) and 2) accurately, visibility here only models 3). That is, points at different layers in skin structure have different light transport and can only be learned by the material network. Therefore, light visibility $\tau_c$ at point x is defined as following, Therefore, light visibility $\tau_c$ at sample x can also be defined with density distribution along the ray representing to what extent can the samples be viewed from the view point, $$\tau_c(x) = \exp(-\int_{xn}^x \sigma(s(t)) dt) \quad (6)$$

where s(t) is the sampled 3D point on the view direction $\omega_o$ from the camera center c with near bounds xn. The equation satisfies $s(t) = c + t\omega_o$. Acquired density and visibility, final color is aggregated and computed at sampled point, illustrated in the following section. Also, lighting can be disentangled from texture by adjusting weight in density and visibility field while keeping the lightmap fully differentiable.

Figure 9:
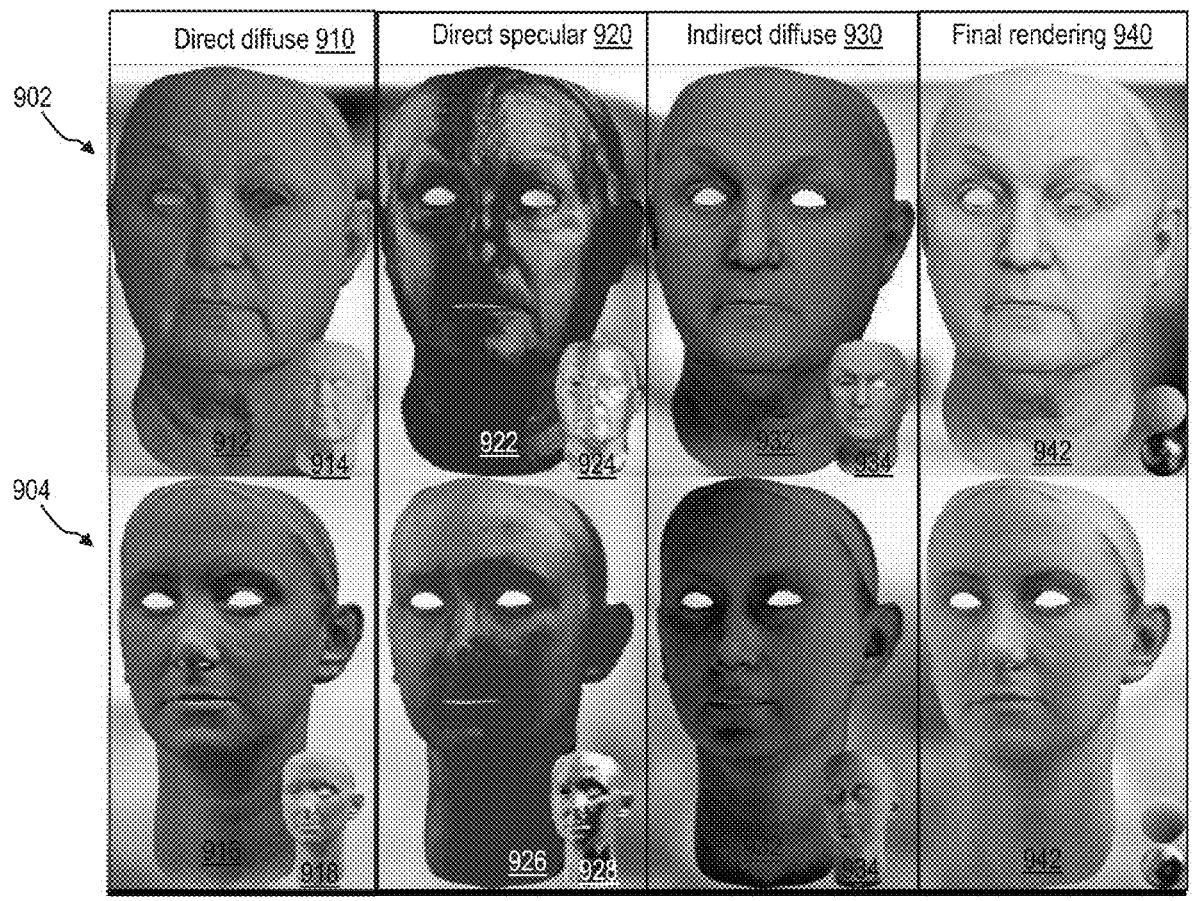
FIG. 9 shows intermediate visualization including example images rendered from direct diffuse, direct specular, and indirect diffuse components, as well as final rendered image, according to one or more embodiments of the present disclosure.

To further illustrate the modeling of physical light transport in the method 500, intermediate results are shown at FIG. 9. Turning to FIG. 9, it shows intermediate visualizations for direct diffuse renderings under column 910, direct specular renderings under column 920, indirect diffuse renderings under column 930, and final renderings under column 940. The intermediate visualizations are shown for a first subject in row 902 and for a second subject in row 904. Further, for each rendering an image pair is shown, where the smaller images (914, 924, 934, and 944 for the first subject, and 918, 928, 938, and 948 for the second subject) show pure light reflection without material absorption and emission. The larger images (912, 922, 932, 942 for the first subject, and 916, 926, 936, and 946 for the second subject) simulates direct and indirect light transport.

As shown, the intermediate decomposition includes direct diffuse, direct specular, and indirect diffuse components. For every image pair, the big one and the small one represents the light transport with and without material energy absorption, respectively. In particular, the direct specular components (under column 910) represents an extent to which the incident radiance is reflected directly. The direct diffuse component (under column 920) models how incident radiance hits epidermis, absorbed and emitted, and the indirect diffuse component (under column 930) models the penetration of the incident light through epidermis and dermis, as well as walk through and bounce around underneath skin surface and exits.

Direct Specular

As mentioned above, the direct specular component models the light that comes from the light source and is reflected directly on the surface without experiencing energy absorption. Given all possible incident ray directions $\omega_i$ at a single point x, the direct specular radiance $L_{ds}$ of outgoing direction $\omega_o$ is calculated using $$L_{ds}(x \to \omega_o) = \int_\Omega f_s(x, \omega_o, \omega_i) L_{direct}(x \leftarrow \omega_i) |\cos\theta_i| d\omega_i \text{ where,} \quad (7)$$

$$f_s(x, \omega_o, \omega_i) = \gamma \cdot \max(\omega_o \cdot \omega_r, 0) = \gamma \cdot \max\left(\omega_o \cdot \left(2 \cdot \frac{\omega_i \cdot n_x}{\|n_x\|^2} - \omega_i\right), 0\right)$$

where $L_{direct}$ is the direct incident radiance, and $n_x$ is the object normal vector at the sample. With predicted skin specular reflectance $\gamma$, an accurate skin specular radiance reflection without energy absorption is modeled.

Direct Diffuse.

The direct diffuse component takes into account the energy absorption between the incident light and particles of the material. To measure diffuse reflection of radiance out of the total incident radiance, the direct diffuse radiance $L_{dd}$ in outgoing direction $\omega_o$ is calculated using $$L_{dd}(x \to \omega_o) = \int_\Omega f_r(x, \omega_o, \omega_i) L_{direct}(x \leftarrow \omega_i) |\cos\theta_i| d\omega_i \quad (8)$$

where, $f_r(x, \omega_o, \omega_i) = \alpha \cdot \max(\omega_i \cdot n_x, 0)$ and where a is albedo at point x Indirect Diffuse.

In order to model light transport underneath the skin including the subsurface bouncing and subsurface scattering in between material particles, (which leads to the visual difference that a thinner skin looks brighter and more reddish under the same lighting condition. Also, indirect light also contributes to shadow softening) as discussed above, the volumetric light map is employed using local spherical harmonics to define indirect light $L_{indirect}$ for building indirect light transport $L_{ss}$. The indirect light transport equation is shown at equation (3) above.

Experimental Data

The following set of experimental data is provided to better illustrate the claimed invention and is not intended to be interpreted as limiting the scope.

Training Dataset:

The training dataset comprises 1) a synthetic multi-view colored image dataset rendered by professionally-tuned Maya Arnold face shader, 2) a lightstage-scanned multi-view colored image dataset under white illumination. Example data in FIGS. 10A and 10B, where the images in FIG. 10A are lightstage-scanned images and the images in FIG. 10B are Maya Arnold rendering. Note that background in both (a) and (b) may be removed before feeding into pipeline.

Maya Arnold-rendered Synthetic Image Dataset

The input rendering assets of Maya Arnold renderer are 101 HDRI environment maps, 86 OLAT environment maps and 21 face assets. The HDRI data covers various illuminations from outdoor open area to indoor small area. An OLAT environment map covers 86 different regions in SkyDome as directional light. 21 subjects cover variety in skin color, age and gender. For 18 among 21 subjects, rendering was performed under different set of 30 randomly picked HDRI maps; while for the 3 other subjects, rendering was performed under all 101 HDRI illumination. All 86 OLAT lighting were rendered for one subject. For both illuminations, 40 fixed-view RGBA-space images of all illumination and face asset combinations were rendered. In total, 160 images were acquired in the synthetic image dataset, where each rendered image has 800×800-pixel resolution. Each subject's face asset consists of a coarse untextured mesh, a normal map, a displacement map and an albedo map. The displacement map represents high-frequency detail (e.g., pore and wrinkle) and was embedded into a further subdivided mesh at the first step. Then, a high-frequency normal map was from the embedded mesh. With professionally tuning, the albedo map and displacement-embedded normal map were mapped onto mesh in the world coordinates. A render farm of 10 workstations utilized to perform ray-tracing rendering.

Lightstage-scanned Real Image Dataset

Lightstage was utilized to additionally capture multi-view images for 48 subjects under white illumination. Besides coverage of diverse skin color, gender and age, the lightstage-scanned dataset consists of 27 expressions of each subject. 16 fixed cameras were set up covering different viewpoint for frontal view. In total, 736 images were acquired in a real image dataset, where each captured image has 3008×4096-pixel resolution.

Training Details

During training camera rays were randomly selected with its corresponding rendering assets including corresponding density value, texture values, environmental light probe and ground truth pixel color. With unpolarized and polarized lightstage scanned images, the network can converge on a functional material module predicting skin reflectance; while together with the lighting augmentation, the light map module can learn a flexible, robust and subject-independent indirect radiance field.

To build the radiance field, 1024 random rays were drawn per batch on GTX 1080Ti which correspond to 1024 pixels to be rendered (or 2048 random rays on Tesla V100), along which we sample 64 points for light propagation. The low-frequency location of 3D points and directions of the rays are transformed to high-frequency input via positional encoding and directional encoding respectively. The lengths of encoded positional and directional embedding were default lengths (63 and 37 respectively). The level of frequency generates sharp images as demonstrated in the results. The encoding is sent through the MLP module with the 2400 RGB image features. The output length of the light map MLP module is 12 for each queried 3D location while that of the material MLP module is 4 including skin roughness (1) and skin sub-surface scattering (3). Then, transport aggregation was conducted to obtain a weighted value for each ray based on the density distribution $\delta(x)$ among the sampled points along the ray, where the values of the each component on rays are aggregated with introduced values from preprocessed albedo and normal maps, and then visualized as an image with pixels representing their intensities following the rendering equation (1). Finally, the rendered RGB values are constrained with ground truth pixel colors.

In summary, the inputs to the rendering model includes a ground-truth face mesh, high-frequency normal map embedded with displacement in UV space, albedo in UV space and realistic synthetic rendering and/or real images along with corresponding HDRI environmental light probe. After the positional encoding and lighting encoding, the rendering pipeline (e.g., according to rendering methods shown at FIGS. 2, 3, 4, and/or 5A-5B) predicts a 12-channel indirect radiance field represented by local light map, 4-channel skin reflectance field as output to feed into our rendering equation (eqn. 3) for ground truth constraints.

To render a face with pore-level details, a high-frequency surface normal map is implemented to enhance the sub-millimeter geometry details in smooth base mesh and albedo maps. In one example, an image-to-image translation strategy using a database captured by lightstage is used to infer fine-level details. In particular, the method described herein infers displacement maps by feeding albedo and geometry maps together (at a pre-processing module). All the texture maps are upscaled to 4K resolution by using super-resolution. Finally, the displacement map may be converted to a high-quality normal map of the given mesh.

Figure 11B:
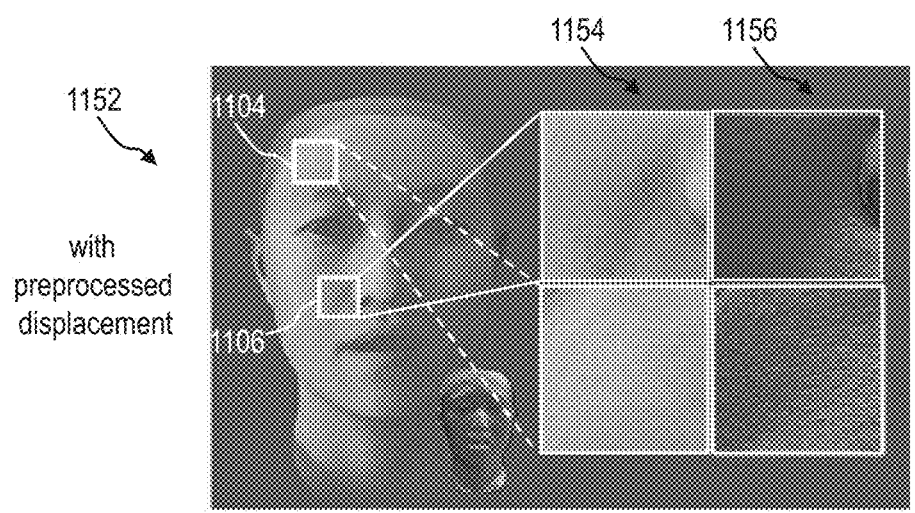
FIG. 11B shows an example image rendered with a high-frequency normal map with displacement, according to one or more embodiments of the present disclosure.

The effectiveness of introducing high frequency normal maps is shown at FIGS. 11A and 11B. In particular, FIG. 11A shows an example rendered image 1102 without high-frequency normal map, and FIG. 11B shows an example rendered image 1152 with high-frequency normal map. In particular, the rendered image 1102 is rendered with estimated normal from input geometry results without introducing normal maps and the rendered image 1152 is rendered with a high-frequency normal map generated with the pre-processing module. Further, FIGS. 11A and 11B show enlarged portions of regions 1104, 1106, under columns 1108 (showing final renderings without high frequency normal map), 1110 (showing low-resolution normal map), 1154 (showing final renderings with high frequency normal map), and 1156 (showing high-frequency normal map). The results demonstrate that displacement-embedded high frequency normal map (also referred to as high-fidelity normal map) improves rendering quality by providing rich pore-level details and enhancing photo-realistic shading effect during the rendering.

Ablation Study on Volumetric Lightmaps

Figure 12:
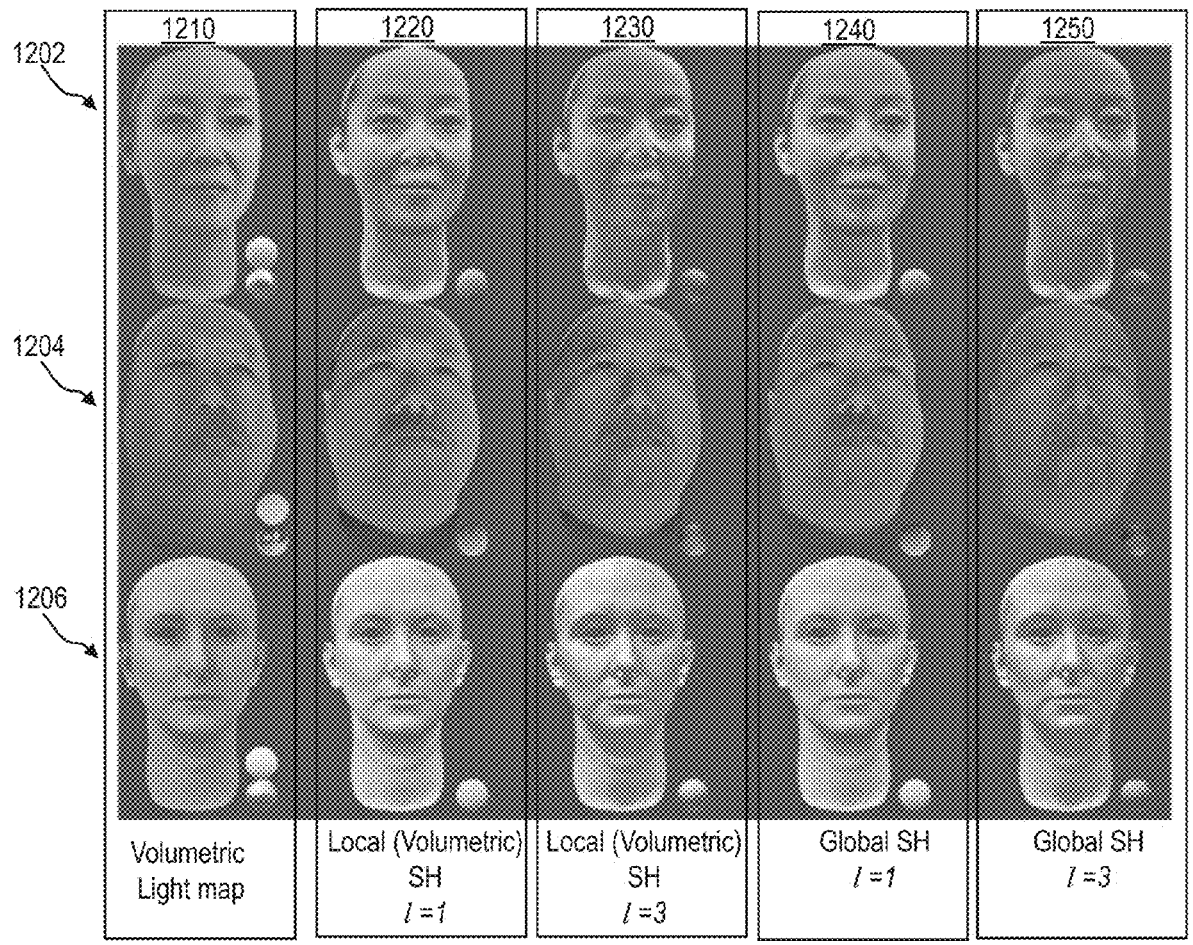
FIG. 12 shows example rendering results based on an ablation study, according to one or more embodiments of the present disclosure.

FIG. 12 shows results of an example volumetric light map ablation study. For each row, 1202, 1204, and 1206, rendering quality comparison is provided on pre-calculated volumetric spherical harmonics to degree l=1 and degree l=3 as well as global spherical harmonics shading also to degree l=1 and degree]=3. Diffuse balls on the side represent the SH light.

To demonstrate the effectiveness of the volumetric light map discussed herein for indirect light representations, several subjects are rendered using the following indirect shading (instead of the volumetric lightmaps discussed herein), while leaving direct light untouched: 1) 1-level volumetric spherical harmonics (column 1220), 2) 3-level volumetric spherical harmonics (column 1230), 3) 1-level global spherical harmonics (under column 1240), 4) 3-level global spherical harmonics (column 1250). The photo-realistic rendering under the first column (column 1210) demonstrates that the volumetric lightmaps configured as discussed herein according to spherical harmonic coefficients derived using the second neural network, such as the second neural network 216 and 522, improves indirect lighting representations.

Qualitative Results

Figure 18:
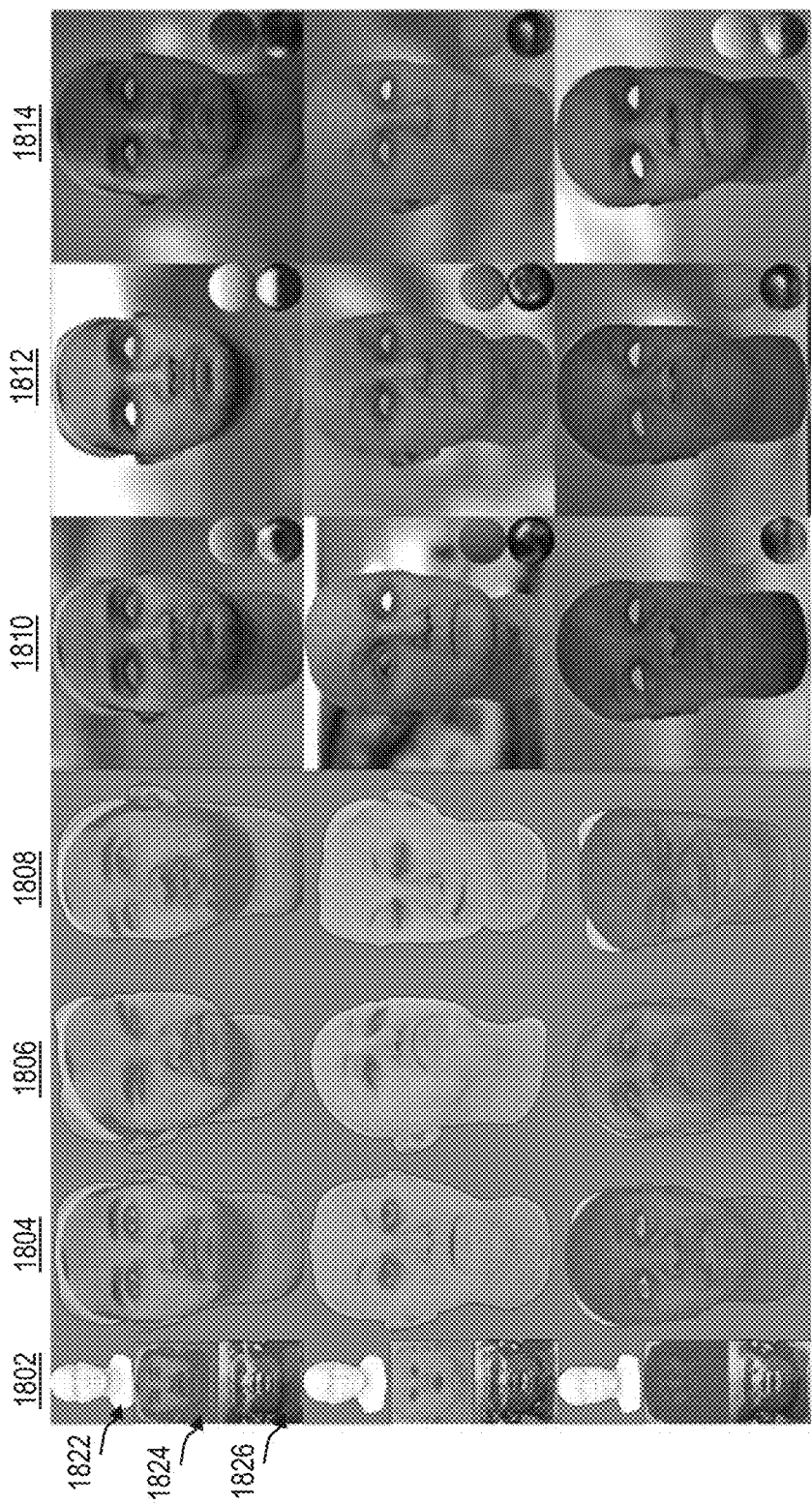
FIG. 18 shows example rendering results including expression changes and illumination changes.

FIG. 18 shows an overall qualitative result. The rendering assets are shown in column 1802 including geometry 1822, albedo map 1824, and normal map 1826 for each subject. Further, a neutral expression rendering (column 1804) and two renderings of arbitrary expressions (columns 1806 and 1808) are shown under all-white illumination. Furthermore, three relighting results with the same neutral expression under a different camera pose are shown (columns 1810, 1812, and 1814). With the rendering pipeline using volumetric light maps for modeling indirect light, the rendering may be performed at any resolution while preserving the rendering quality. Further, a comparison of the renderings with ground truth is provided below.

Lightstage Diffuse Light.

Figure 19:
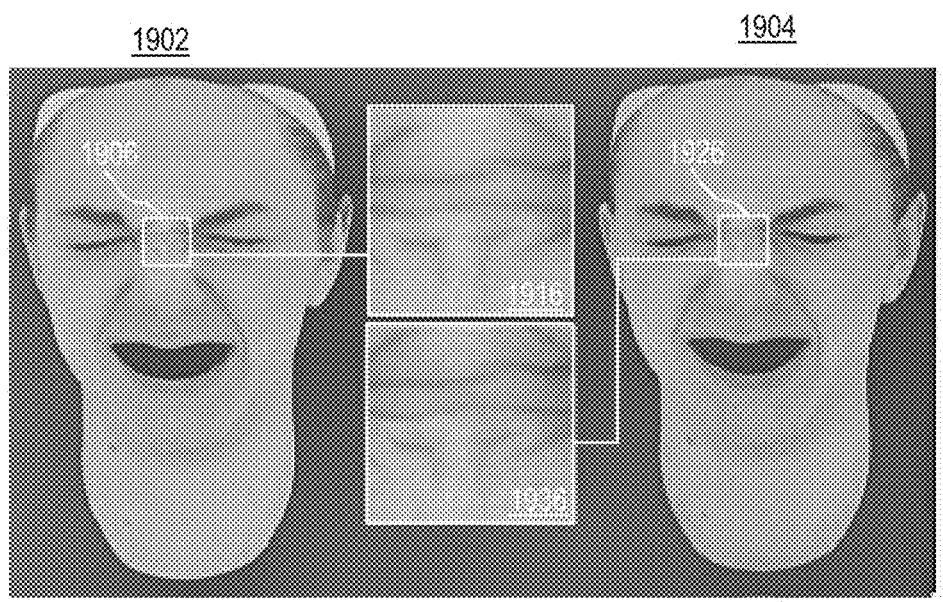
FIG. 19 shows example rendering results compared with ground truth (lightstage images)

With the rendering method discussed herein, rendering that achieves the lightstage scan-level quality may be achieved with reduced rendering times. At FIG. 19, a closer view of the rendered results under all-white illumination is shown, where in each pair of images, the left image 1902 is the original lightstage image with background removed and the right image 1904 is the rendered image under the same lighting using the same camera poses using the rendering pipeline described herein. Further, 1916 is an enlarged portion of portion 1906 of the lightstage image 1902 and 1936 is an enlarged portion of corresponding portion 1926 of the image 1904 rendered via the rendering pipeline described herein (that is using the first neural network for skin reflectance and the second neural network for indirect light transport)

Figure 20:
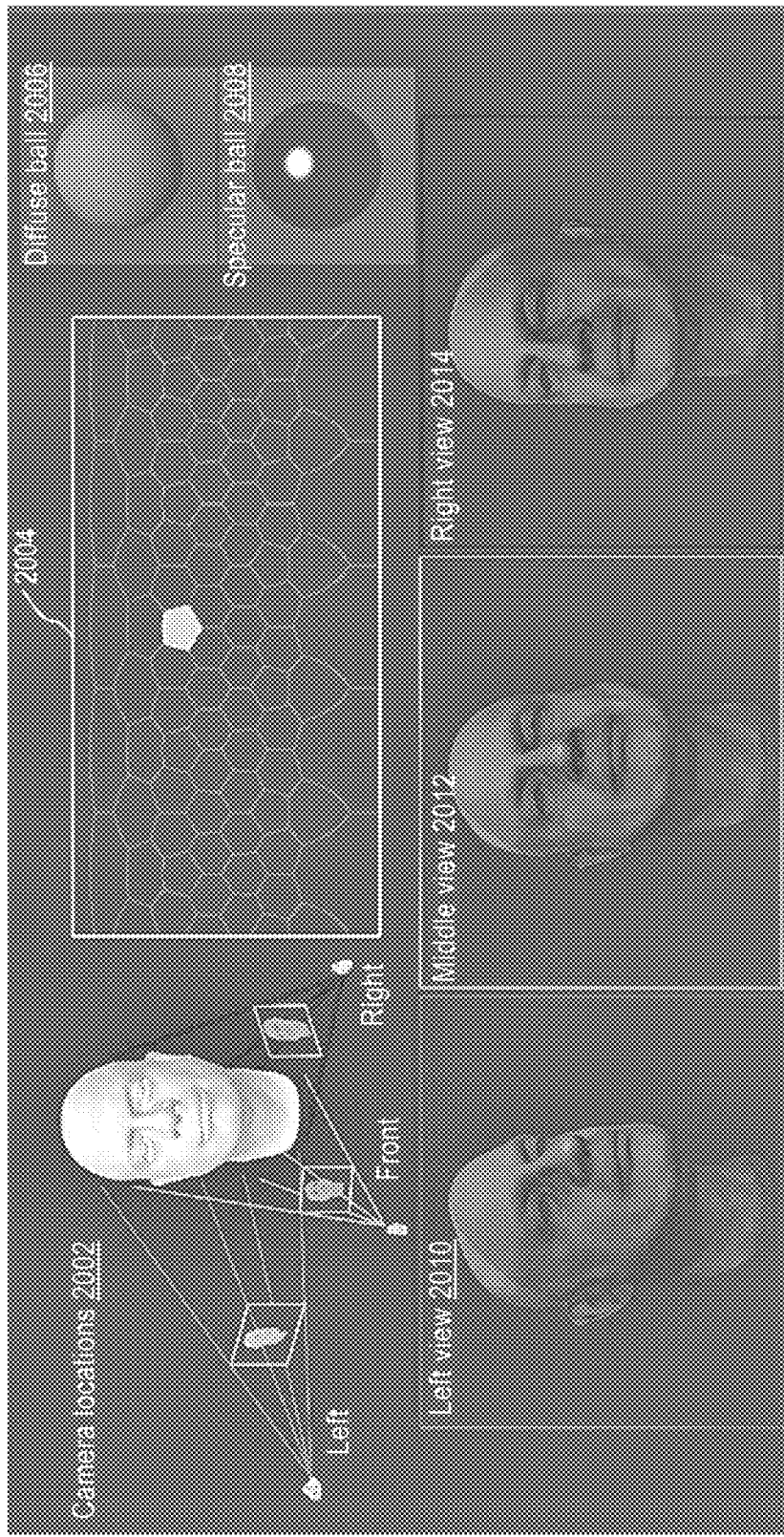
FIG. 20 shows example multiple view renderings under an example lighting condition.
Figure 21:
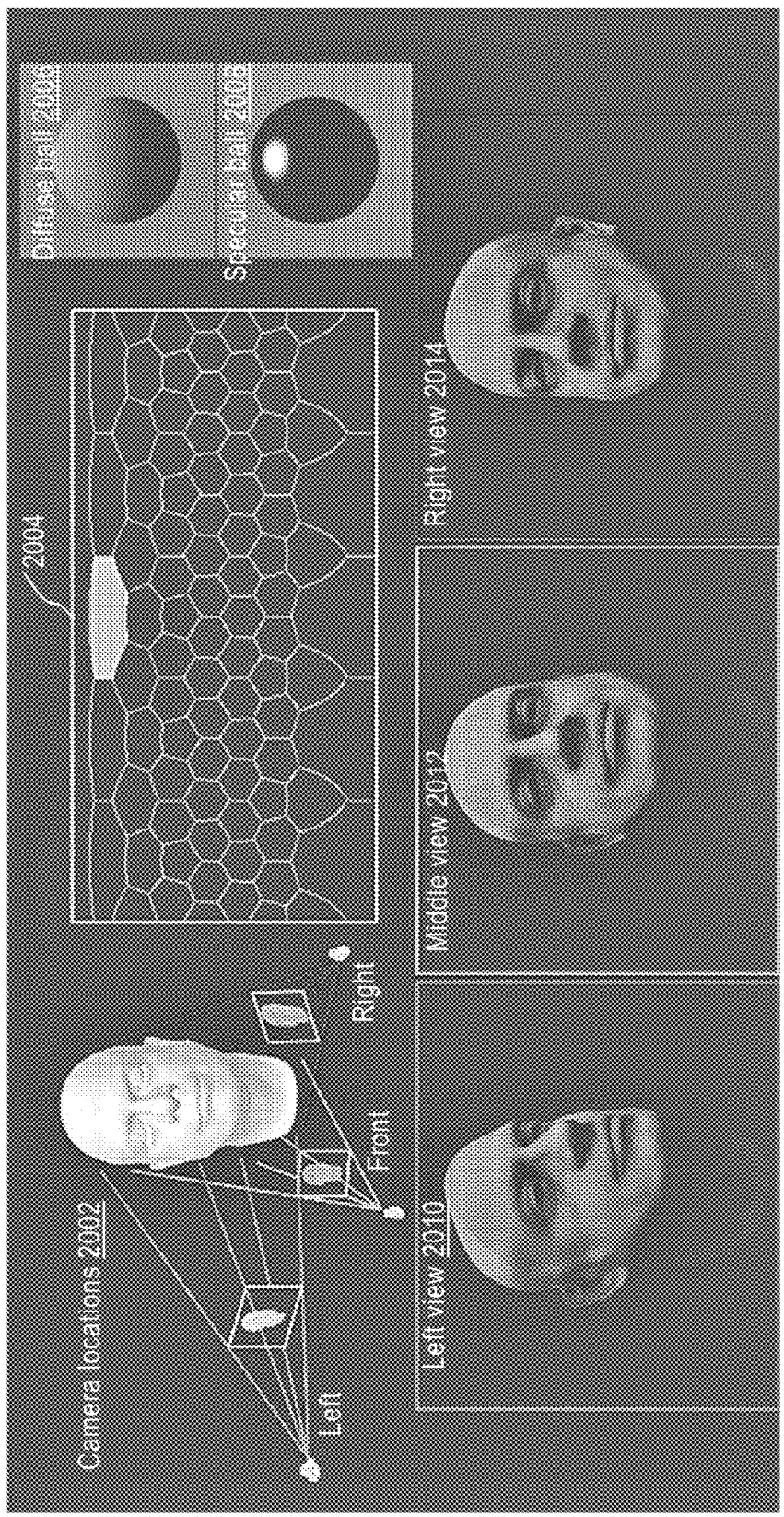
FIG. 21 shows the multiple view renderings of FIG. 20 under a different lighting condition.
Figure 22:
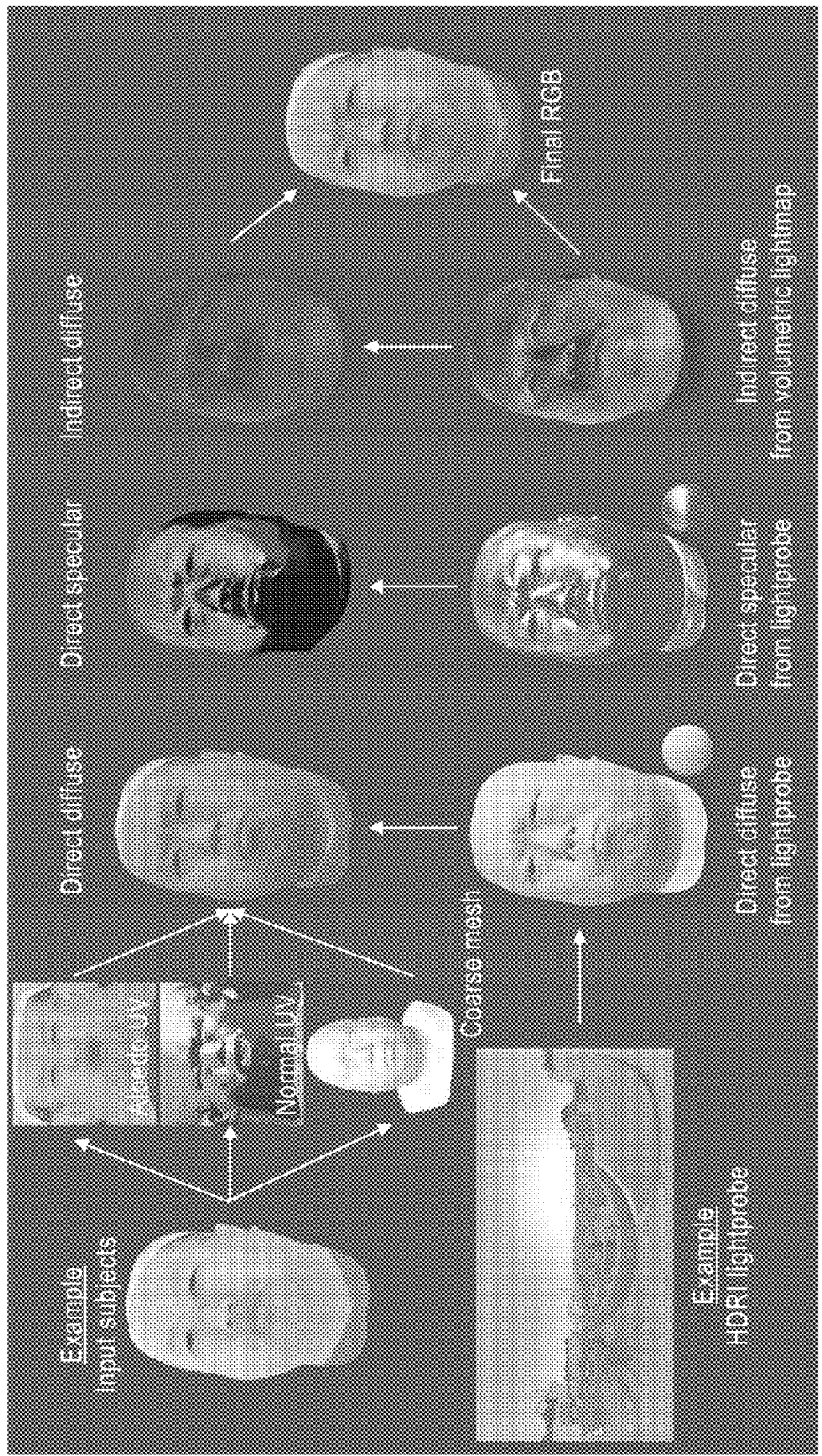
FIG. 22 shows an example rendering pipeline including input image maps (albedo, normal, geometry) and input lighting condition (HDRI light probe), intermediate visualization of direct diffuse, direct specular, and indirect diffuse renderings, and final rendered image.

Similarly, the method discussed herein provides rendering under different lighting conditions with selected HDRI light probes as environmental texture input with quality comparable to Maya Augmented Light (not shown). Further, under one light at a time (OLAT) conditions, skin wrinkles and forehead specularity are rich and sharp in HDRI comparisons and nose highlight flows with the rotation of the direct light under OLAT setting. Example rendering under OLAT is shown at FIGS. 20 and 21. In particular, FIGS. 20 and 21 show renderings of different views (left view 2010, front view 2012, and right view 2014) and the corresponding camera angles under different OLAT conditions. Further, the diffuse sphere representation 2006 and specular sphere representation 2006 of the OLAT condition is also shown. An example 2D representation of lighting is shown at 2004.

Testing on Other Datasets.

Further, the rendering pipeline described herein is generalizable to other datasets, including Triple-gangers scans, 3D Scan Store, FaceScape scan, and in-the-wild single image datasets (not shown). Given a scanned dataset and a desired environmental light probe, the rendering pipeline may be used to generate a corresponding volumetric light map and a corresponding facial material using lightstage trained neural network models (that is, the first and the second neural networks discussed herein) resulting in photo-realistic rendering. As for single image input, the geometry and sharp surface normal may be inferred via the preprocessing modules and then the inferred assets may be utilized for high fidelity rendering. In this way, the rendering pipeline discussed herein is generalizable to other datasets.

General Objects.

Figure 13:
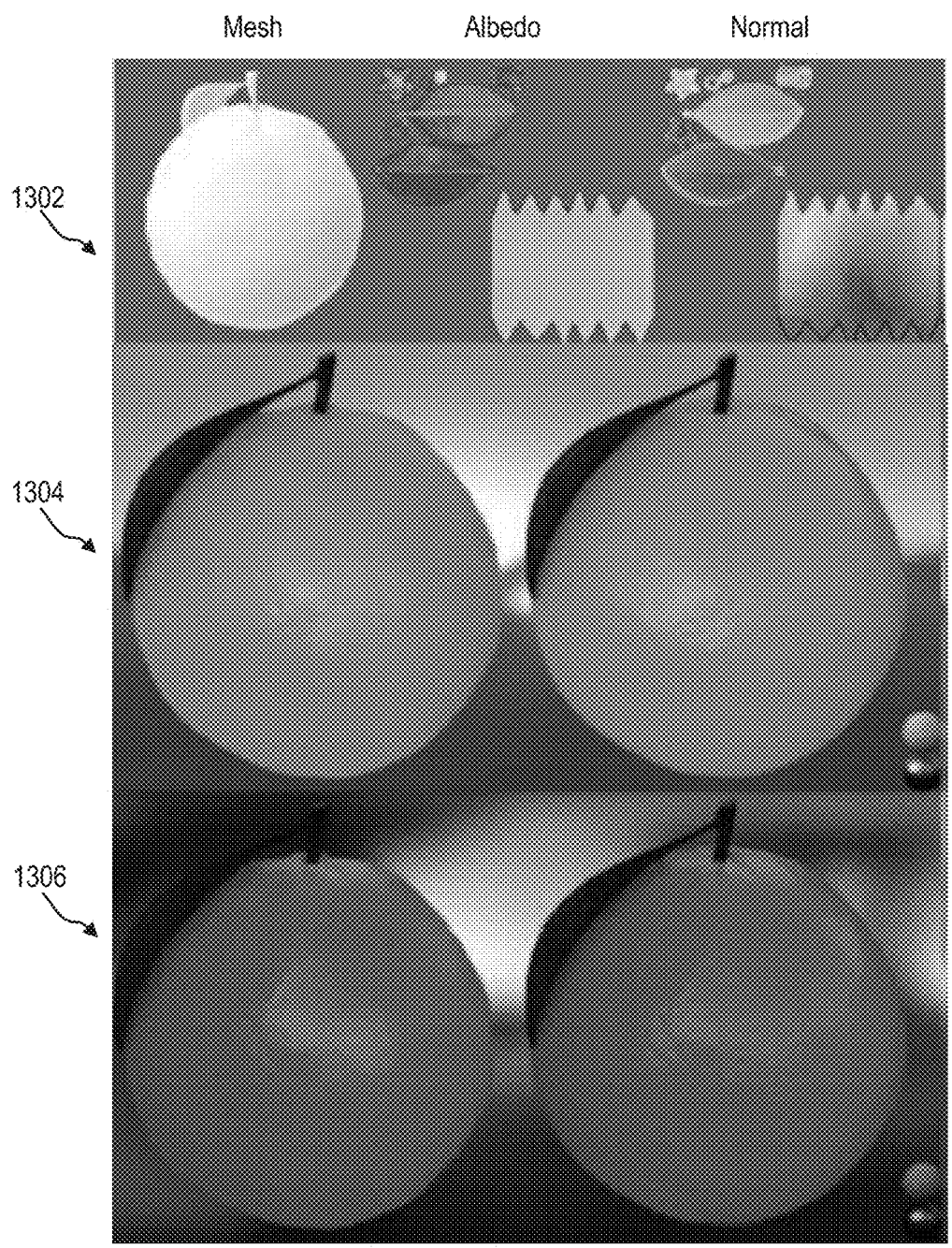
FIG. 13 shows example renderings of an object, according to one or more embodiments of the present disclosure.

Furthermore, the physically-based rendering pipeline described herein may be implemented for rendering general objects as shown in FIG. 13. In particular, the first row 1302 exhibits the input assets of general objects and the second and third rows 1304 and 1306 display the results showing comparison with Maya Arnold rendering, where for every image pair, the left image is rendered with the rendering pipeline while the right image is the ground truth reference.

Baseline Comparisons

FIG. 14 shows baseline information summary. To evaluate the functionality and performance of the rendering method discussed herein, five state-of-the-art methods were used as our baseline. As listed in FIG. 14, first, the requirement of input for training was identified and then their functionality was analyzed by 1) input lighting representations (i.e., directional light, HDRI lightprobe, spherical harmonics), 2) capability to query novel face subject without re-training or fine tuning, and 3) capability to render in novel viewpoint.

Figure 15:
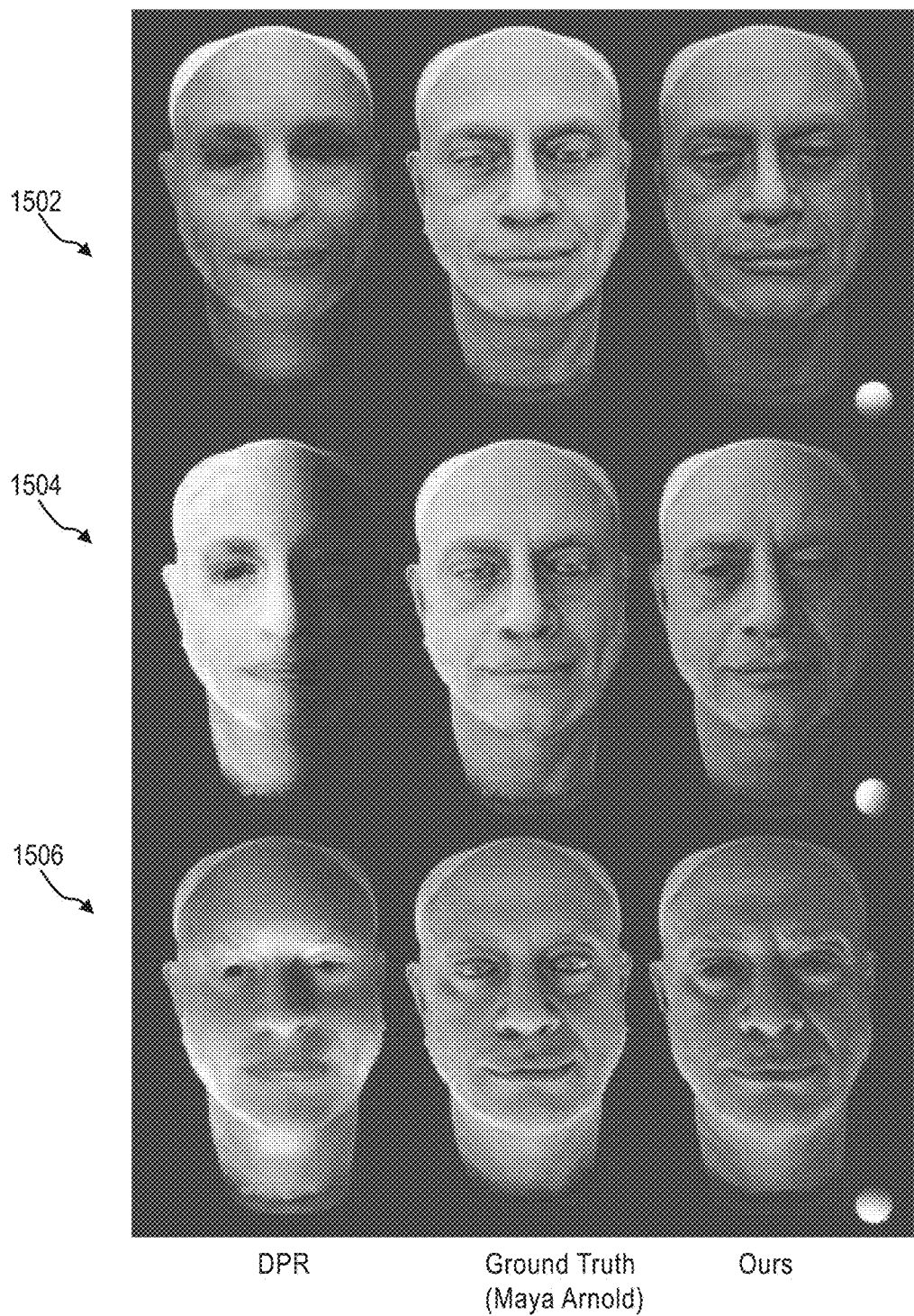
FIG. 15 shows qualitative comparisons of example images rendered according to the present disclosure with ground truth and DPR under different lighting angles.

FIG. 15 shows qualitative result comparison with DPR. We unwrap the spherical harmonics representation of the provided input as environmental textures matching the input format discussed herein and perform qualitative comparison on final rendering results. Also, the physically based rendering reference from Maya Arnold is provided as ground truth under the same light settings. Regardless of the lighting intensity, the method according to the rendering method described herein (e.g., method 200, 300, or 500) achieves better quality. In particular, Deep Single-Image Portrait Relighting (DPR) is an image-based relighting method that estimates normal map and extracts input illumination in a spherical harmonics representation. The method is useful when only single image is available. However, the method needs all-white illumination to extract accurate albedo map, which is usually not practical. The proposed normal estimation loses sharpness leading to overly smooth outputs with less realism. Also, limited by the lighting representation, the work is unable to achieve rendering with directional lighting or HDRI environmental lighting.

Figure 16:
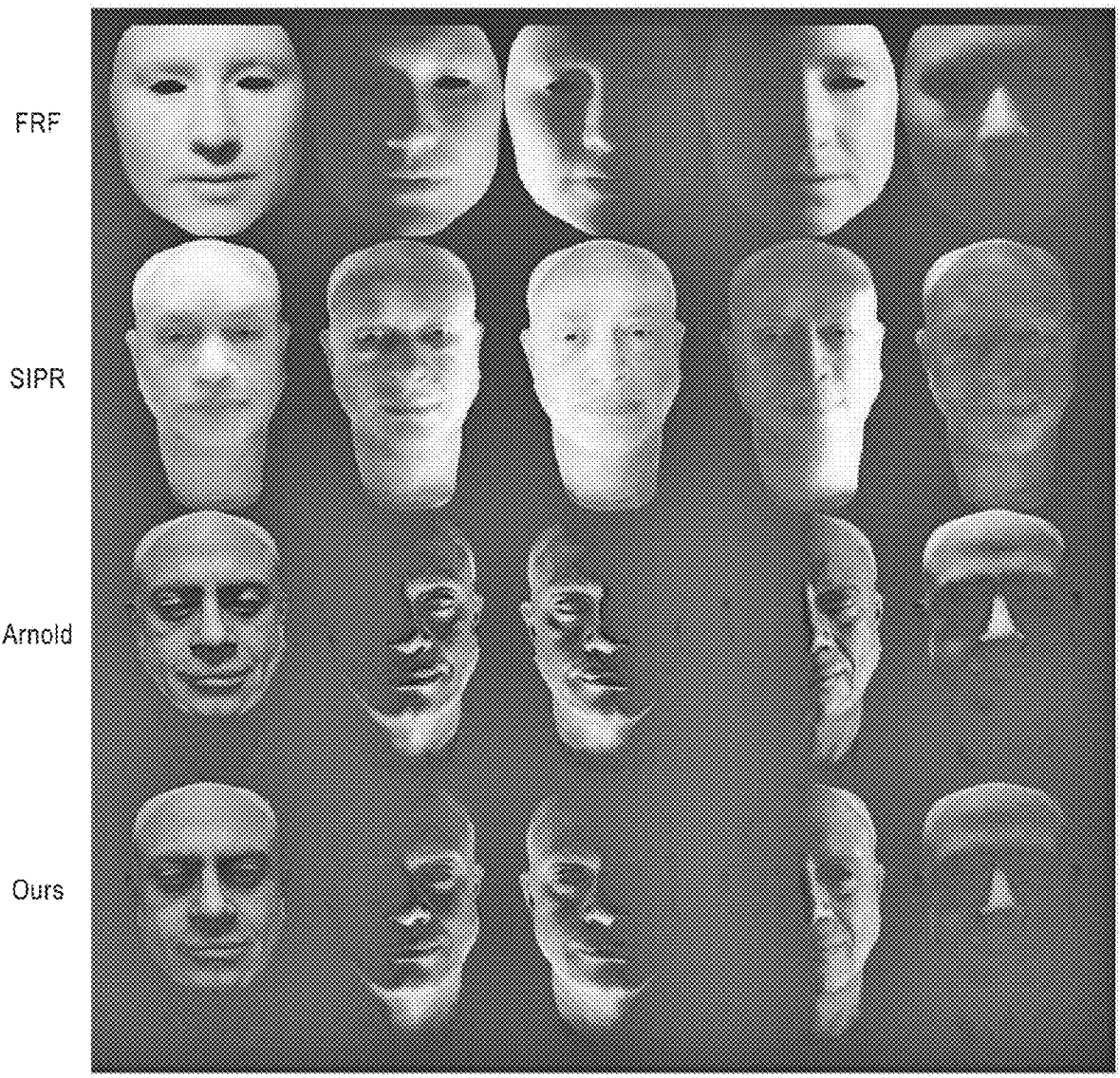
FIG. 16 shows qualitative comparisons of example images rendered according to the present disclosure with other renderers under one light at a time (lighting) conditions.

FIG. 16 shows comparisons of HDRI relighting between the method discussed herein and selected baselines, including FRF and SIPR. The rendering method described herein preserves accurate identity from face mesh and relighting by global illumination without recognizable artifact from training dataset, such as highlight silhouette. Additionally, the result from the method discussed herein is sharper than Maya Arnold rendering and has less plastic-rubber material appearance.

In one example, Single Image Portrait Relighting (SIPR) is a more recent single-image-based relighting method, which is trained on a dataset consisting of more than 2,500 illumination including OLAT and HDRI. Though the pipeline can achieve relighting in a relatively good quality, it easily overfits to training lighting-subject pair. The SIPR method yields inaccurate estimation of HDRI environment map and underperforms in cases with hard shadows. It, therefore, has unexpected bright spots and is unable to cast hard shadow in OLAT comparison as shown in FIG. 16.

In another example, Monocular Reconstruction of Neural Face Reflectance Fields (FRF) provides a reflectance network for casting hard shadow and generates strong specular.

Despite the quality of inferred geometry, the combination of OLAT is inaccurate when synthesizing environmental light. As seen in FIG. 16, similar to DPR, FRF also loses sharpness when estimating normal map from single view image, especially in regions with strong specularity or shadow.

In another example, Neural Pre-Integrated Lighting for Reflectance Decomposition Neural-PIL is sensitive to illumination of inputs, i.e. varying lighting and cast shadow, which could lead to decomposition failure. Also, Neural-PIL introduces extra noises from neighbor pixels during high frequency encoding.

Further, Neural Light-transport Field (NeLF) for Single Portrait View Synthesis and Relighting uses only a global specular coefficient missing high frequency details in the regions. Also, the rendering heavily depends on geometry estimation and light sampling, which causes artifacts (e.g., holes) and wrong shading.

Quantitative Results

TABLE 1

Facial rendering speed benchmark on different resolution

| Renderer | 800 × 800 | 1440 × 1440 | 2880 × 2880 | 5760 × 5760 |
|---|---|---|---|---|
| Maya | 130 s | 370 s | 1857 s | 7848 s |
| Rendering pipeline based on volumetric lightmap and material networks | 3 s | 8 s | 31 s | 158 s |

Rendering Speed.

The rendering method described herein leveraging deep learning module achieves both improvement in quality and reduction in rendering speed at the same time. Table 1 shows a comparison between Maya and query to the rendering model in average rendering speed. The method described herein is implemented on one NVIDIA V100 GPU for comparison and achieved a 7-13 times faster rendering on average. Also, the rendering time is specified with our optimization in the table, which is achievable with engineering and could achieve even 47-49 times faster.

TABLE 2

Facial rendering metrics at 512 × 512 resolution

| Baseline | FRF | SIPR | NeLF | Neural-PIL | Ours |
|---|---|---|---|---|---|
| PSNR | 31.1054 | 34.2235 | 34.9882 | 34.2594 | 40.5191 |
| SSIM | 0.1676 | 0.1889 | 0.2305 | 0.2087 | 0.9616 |

Metrics Evaluation.

In addition to only the visual comparison on relighting, the Peak Signal to Noise Ratio (PSNR) and Structural Similarity Index (SSIM) evaluation is performed on the proposed method and other baselines anchored on Maya Arnold rendered references at 512×512 resolution. The rendering method described herein achieves improved scores in both PSNR and SSIM as shown in Table 2.

User Study

Figure 17:
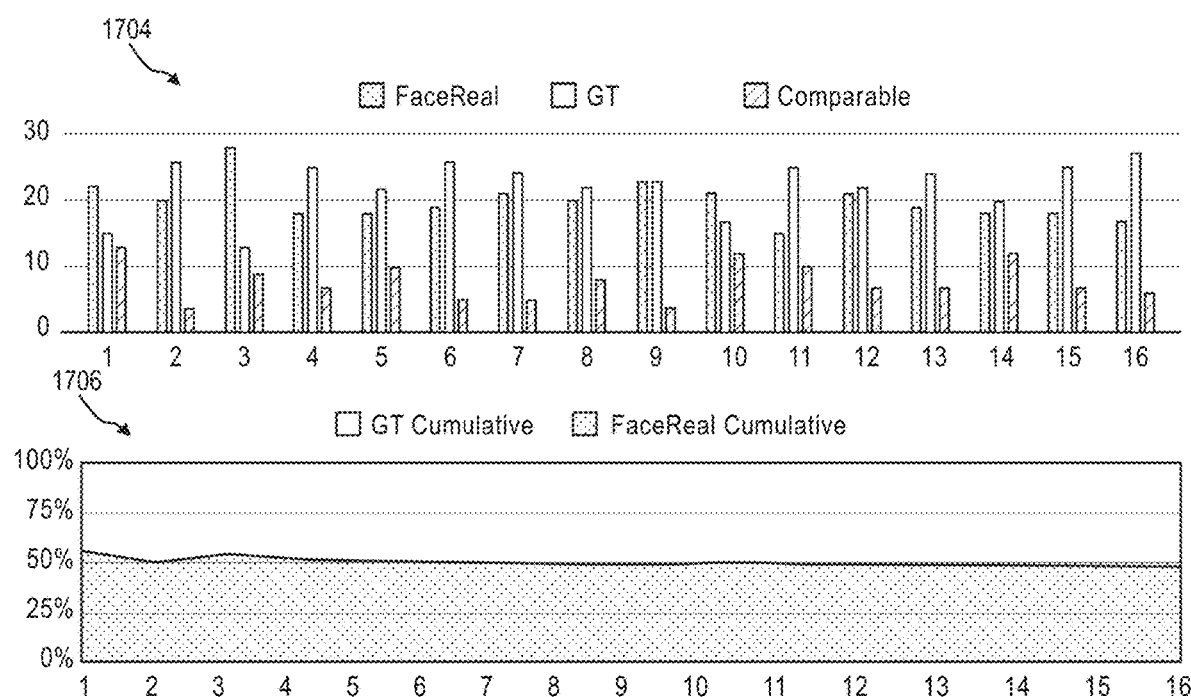
FIG. 17 shows example charts depicting results from a user study on rendering quality.

To further demonstrate the quality of the neural skin shader implemented according the rendering methods described herein, a user study of the results on ground truth was conducted, where 16 pairs of images were randomly selected from our testing dataset covering different ages, genders, and skin color with industry-level rendered images. For every single pair, the order of the images is shuffled. That is, there is no extra information indicating whether the image is generated from the pipeline discussed herein or ground truth references, and participants were asked to select which image in the pair wins more realism. Further, a "cannot tell" option was provided for every pair. FIG. 17 shows the user study on rendering quality polled. The column chart 1704 exhibits the raw results collected from the poll on every image pair that includes the rendered images via the rendering method described herein and ground truth (GT) references. The stacked area chart 1706 represents the cumulative results based on raw, where comparable is counted with one score for the rendered images and one score for GT references.

From the 50 collected data shown in FIG. 17, the rendering results have an overall 47.95% wining rate (wins 444), while the ground truth wins 52.05% (wins 482), indicating that the rendering algorithm described herein is overall competitive as the ground truth reference images.

Selected Embodiments

Although the above description and the attached claims disclose a number of embodiments of the present invention, other alternative aspects of the invention are disclosed in the following further embodiments.

Embodiment 1: A method for rendering an image of a subject or an object, the method comprising: receiving, at a processor, one or more first input images of the subject or the object, and a desired lighting condition; processing, via the processor, the one or more input images to output one or more rendering assets; generating, via the processor, a volumetric radiance field corresponding to the subject or the object and a desired lighting condition based on one or more of the one or more rendering assets, a first trained neural network and a second trained neural network; and rendering, via a display communicatively coupled to the processor, a second image of the subject or the object under the desired lighting condition.

Embodiment 2: The method of embodiment 1, wherein the one or more rendering assets include one or more of a normal map associated with the one or more input images, an albedo map associated with the one or more input images, and a three-dimensional geometry corresponding to the subject or the object in the one or more input images.

Embodiment 3: The method of embodiment 2, wherein the normal map is a high-frequency normal map based on a displacement map associated with the one or more input images.

Embodiment 4: The method of embodiment 1, wherein the first trained neural network and the second trained neural network are trained on a set of training images, the set of training images acquired via a lightstage system.

Embodiment 5: The method of embodiment 4, wherein a subset of the training images is augmented under different lighting conditions.

Embodiment 6: The method of embodiment 2, wherein the first trained neural network is trained to output a set of reflectance representations for each sample in the three-dimensional geometry.

Embodiment 7: The method of embodiment 6, wherein the set of reflectance representations include one or more roughness representations and one or more scattering representations.

Embodiment 8: The method of embodiment 2, wherein the second trained neural network is trained to output a volumetric light map comprising set of indirect light representations for each sample in the three-dimensional geometry.

Embodiment 9: The method of embodiment 8, wherein the sample is a voxel; and wherein the set of indirect light representation include a plurality of spherical harmonic representations.

Embodiment 10: The method of embodiment 1, wherein the desired lighting condition is based on a high dynamic range imaging map.

Embodiment 11: A method for rendering an image of a subject or an object, the method comprising: receiving, at a processor, one or more first input images including the subject or the object, a desired camera viewing angle of the subject, and a desired lighting condition; generating, via the processor, a set of reflectance representations using a first trained neural network, the set of skin reflectance representations based on the one or more input images and the desired camera viewing angle; generating, via the processor, a volumetric light map comprising a set of indirect light representations using a second trained neural network based on one or more of the one or more first input images, the desired camera viewing angle, and the desired lighting condition; and generating, via the processor, a volumetric radiance field based on the set of reflectance representations, the volumetric light map, and the one or more input images; rendering, via a display communicatively coupled to the processor, a second image of the subject or the object at the desired viewing angle and the desired lighting condition.

Embodiment 12: The method of embodiment 11, further comprising: receiving, at the processor, a second desired lighting condition; generating, via the processor, a second volumetric light map comprising a second set of indirect light representations using the second trained neural network based on the one or more input images, the desired camera viewing angle, and the second desired lighting condition; and generating, via the processor, a second volumetric radiance field based on the set of reflectance representations, the second volumetric light map, and the one or more input images; rendering, via the display, a third image of the subject or the object, the third image relighted according to the second volumetric light map.

Embodiment 13: The method of embodiment 11, wherein generating the volumetric radiance field based on the one or more input images and the desired camera viewing angle comprises generating a normal map associated with the one or more input images, and an albedo map associated with the one or more input images.

Embodiment 14: The method of embodiment 13, wherein generating the volumetric radiance field further includes generating a three-dimensional geometry mesh corresponding to the subject or the object in the one or more input images.

Embodiment 15: The method of embodiment 13, wherein the normal map is a high-frequency normal map based on a displacement map associated with the one or more input images.

Embodiment 16: The method of embodiment 11, wherein the first trained neural network and the second trained neural network are trained on a set of training images, the set of training images acquired via a lightstage system.

Embodiment 17: The method of embodiment 16, wherein a subset of the training images are augmented under different lighting conditions.

Embodiment 18: The method of embodiment 12, wherein the first lighting condition comprises a first high dynamic range imaging map corresponding to the first lighting condition; and wherein the second lighting condition comprises a second high dynamic range imaging map corresponding to the second lighting condition.

Embodiment 19: A system, comprising: one or more memories storing instructions and storing a first trained neural network model and a second trained neural network model; one or more processors that are coupled to the one or more memories and when executing the instructions, are configured to: generate a set of reflectance representations corresponding to a subject in a first image, according to a first trained neural network model; generate a first volumetric light map including a set of indirect light representations corresponding to the subject and a first lighting condition, according to a second trained neural network model; and render one or more second images of the subject under the desired lighting condition based on the set of reflectance representations and the first volumetric light map.

Embodiment 20: The system of embodiment 19, wherein the one or more processors are further configured to: generate one of more rendering assets based on the first image, the first lighting condition, and a first camera viewing angle.

Embodiment 21: The system of embodiment 20, wherein the one or more rendering assets include one or more of a normal map associated with the first image, an albedo map associated with the first image, and a three-dimensional geometry corresponding to the subject in the first image.

Embodiment 22: The system of embodiment 21, wherein the normal map is a high-frequency normal map based on a displacement map associated with the first image.

Embodiment 23: The system of embodiment 19, wherein the first trained neural network and the second trained neural network are trained on a set of training images, the set of training images acquired via a lightstage system; and wherein a subset of the training images is augmented under different lighting conditions.

Embodiment 24: The system of embodiment 19, wherein the set of indirect light representation include a plurality of spherical harmonic representations.

Embodiment 25: The system of embodiment 19, wherein the one or more processors are further configured to: responsive to receiving a second lighting condition, different from the first lighting condition, generate a second volumetric light map comprising a second set of indirect light representations corresponding to the subject and the second lighting condition using the second trained neural network models; and render a third image of the subject under the second lighting condition based on the set of reflectance representations and the second volumetric light map.

Embodiment 26: The system of embodiment 25, wherein the first lighting condition comprises a first high dynamic range imaging map corresponding to the first lighting condition; and wherein the second lighting condition comprises a second high dynamic range imaging map correspond to the second lighting condition.

CONCLUSION

The various methods and techniques described above provide a number of ways to carry out the invention. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, the terms "a" and "an" and "the" and similar references used in the context of describing a particular embodiment of the application (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Certain embodiments of this application are described herein. Variations on those embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

The invention claimed is:

1. A method for rendering an image of a subject or an object, the method comprising:
   receiving, at a processor, one or more first input images of the subject or the object, and a desired lighting condition;
   processing, via the processor, the one or more input images of the subject or the object to output one or more rendering assets;
   generating, via the processor, a volumetric radiance field corresponding to the subject or the object and the desired lighting condition based on the one or more rendering assets, a set of skin reflective representations based on the one or more input images generated from a first trained neural network and a volumetric light map of indirect light representations based on the one or more input images generated from a second trained neural network, wherein the first and second trained neural networks are trained on a set of training images of the subject or the object positioned in a light stage system with a light source illuminating the subject or object with a controllable field of lighting; and
   rendering, via a display communicatively coupled to the processor, a second image of the subject or the object under the desired lighting condition.

2. The method of claim 1, wherein the one or more rendering assets include one or more of a normal map associated with the one or more input images, an albedo map associated with the one or more input images, and a three-dimensional geometry corresponding to the subject or the object in the one or more input images.

3. The method of claim 2, wherein the normal map is a high-frequency normal map based on a displacement map associated with the one or more input images.

4. The method of claim 2, wherein the first trained neural network is trained to output the set of reflectance representations for each sample in the three-dimensional geometry.

5. The method of claim 4, wherein the set of reflectance representations include one or more roughness representations and one or more scattering representations.

6. The method of claim 2, wherein the second trained neural network is trained to output the volumetric light map comprising a set of indirect light representations for each sample in the three-dimensional geometry.

7. The method of claim 6, wherein the sample is a voxel; and wherein the set of indirect light representations include a plurality of spherical harmonic representations.

8. The method of claim 1, wherein a subset of the training images is augmented under different lighting conditions.

9. The method of claim 1, wherein the desired lighting condition is based on a high dynamic range imaging map.

10. A method for rendering an image of a subject or an object, the method comprising:
receiving, at a processor, one or more first input images including the subject or the object, a desired camera viewing angle of the subject, and a desired lighting condition;
learning, via the processor, a set of reflectance representations using a first trained neural network, the set of skin reflectance representations based on the one or more first input images including the subject or the object and the desired camera viewing angle;
generating, via the processor, a volumetric light map based on a set of indirect light representations learnt using a second trained neural network based on one or more of the one or more first input images, the desired camera viewing angle, and the desired lighting condition;
generating, via the processor, a volumetric radiance field based on the set of skin reflectance representations, the volumetric light map, and the one or more first input images; and
rendering, via a display communicatively coupled to the processor, a second image of the subject or the object at the desired camera viewing angle and the desired lighting condition.

11. The method of claim 10, further comprising:
receiving, at the processor, a second desired lighting condition;
generating, via the processor, a second volumetric light map based on a second set of indirect light representations learnt using the second trained neural network based on the one or more input images, the desired camera viewing angle, and the second desired lighting condition;
generating, via the processor, a second volumetric radiance field based on the set of reflectance representations, the second volumetric light map, and the one or more input images; and
rendering, via the display, a third image of the subject or the object, the third image relighted according to the second volumetric light map.

12. The method of claim 11, wherein the first desired lighting condition comprises a first high dynamic range imaging map corresponding to the first desired lighting condition; and wherein the second desired lighting condition comprises a second high dynamic range imaging map corresponding to the second desired lighting condition.

13. The method of claim 10, wherein generating the volumetric radiance field based on the one or more input images and the desired camera viewing angle comprises generating a normal map associated with the one or more input images, and an albedo map associated with the one or more input images.

14. The method of claim 13, wherein generating the volumetric radiance field further includes generating a three-dimensional geometry mesh corresponding to the subject or the object in the one or more input images.

15. The method of claim 13, wherein the normal map is a high-frequency normal map based on a displacement map associated with the one or more input images.

16. A system, comprising:
one or more memories storing instructions and storing a first trained neural network model and a second trained neural network model;
one or more processors that are coupled to the one or more memories and when executing the instructions, are configured to:
generate a set of reflectance representations corresponding to a subject in a first image, according to a first trained neural network model;
generate a first volumetric light map including a set of indirect light representations corresponding to the subject and a first lighting condition, according to a second trained neural network model; and
render one or more second images of the subject under a desired lighting condition based on the set of reflectance representations and the first volumetric light map.

17. The system of claim 16, wherein the one or more processors are further configured to:
generate one or more rendering assets based on the first image, the first lighting condition, and a first camera viewing angle.

18. The system of claim 17, wherein the one or more rendering assets include one or more of a normal map associated with the first image, an albedo map associated with the first image, and a three-dimensional geometry corresponding to the subject in the first image.

19. The system of claim 18, wherein the normal map is a high-frequency normal map based on a displacement map associated with the first image.

* * * * *